US012737275B2

(12) United States Patent
Yasin et al.

(10) Patent No.: US 12,737,275 B2
(45) Date of Patent: Sep. 15, 2026

(54) DEVICE, METHOD, AND SYSTEM TO DETERMINE A COUNT OF RETIRED PREFETCH INSTRUCTIONS

(71) Applicant: Intel Corporation, Santa Clara, CA (US)

(72) Inventors: Ahmad Yasin, Haifa (IL); Anton Hanna, Nof Hagalil (IL); Yuval Alon, Haifa (IL); Amandeep Kaur, Ropar (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,978

(22) Filed: Sep. 30, 2022

(65) Prior Publication Data

US 2024/0111656 A1 Apr. 4, 2024

(51) Int. Cl.

| | |
|---|---|
| ***G06F 11/34*** | (2006.01) |
| ***G06F 9/30*** | (2018.01) |
| ***G06F 12/0862*** | (2016.01) |

(52) U.S. Cl.

CPC ...... *G06F 11/3495* (2013.01); *G06F 9/30145* (2013.01)

(58) Field of Classification Search

None

See application file for complete search history.

(56) References Cited

U.S. PATENT DOCUMENTS

| | | | | |
|---|---|---|---|---|
| 8,006,082 | B2 * | 8/2011 | Kinzhalin | G06F 9/44505 713/1 |
| 9,465,680 | B1 | 10/2016 | Chynoweth et al. | |
| 10,140,056 | B2 | 11/2018 | Yasin et al. | |
| 10,909,015 | B2 | 2/2021 | Yasin et al. | |
| 10,997,048 | B2 | 5/2021 | Yasin | |
| 12,298,875 | B2 * | 5/2025 | Chen | G06F 11/3476 |
| 2003/0191900 | A1 * | 10/2003 | Hooker | G06F 12/0862 712/E9.055 |
| 2004/0078673 | A1 * | 4/2004 | Decker | G06F 11/3676 714/33 |

(Continued)

OTHER PUBLICATIONS https://github.com/aayasin/perf-tools> Github 2022.

(Continued)

*Primary Examiner* — Hyun Nam

(74) *Attorney, Agent, or Firm* — Essential Patents Group, LLP

(57) ABSTRACT

Techniques and mechanisms for circuitry of a processor to determine a count of prefetch instructions which have been retired, or are designated for retirement. In an embodiment, a performance monitoring unit (PMU) monitors the execution of an instruction sequence by a core of said processor. The PMU detects the retirement of a first instruction, and further makes a first determination that the instruction is of a prefetch instruction type. Based on the first determination, counter circuitry of the processor updates a count of one or more instruction retirements, wherein each such retired instruction is of the prefetch instruction type. The PMU further makes a second determination that another retired second instruction is of a non-prefetch instruction type. In another embodiment, the counter circuitry prevents any updating of that same count based on the second determination.

20 Claims, 17 Drawing Sheets

(56) References Cited

U.S. PATENT DOCUMENTS

| | | | | |
|---|---|---|---|---|
| 2010/0082950 | A1* | 4/2010 | Kinzhalin | G06F 9/44505 712/E9.032 |
| 2010/0153956 | A1* | 6/2010 | Capps, Jr. | G06F 11/3409 712/E9.032 |
| 2012/0297168 | A1* | 11/2012 | Chen | G06F 9/3858 712/206 |
| 2016/0092382 | A1* | 3/2016 | Anvin | G06F 9/4812 710/269 |
| 2016/0179650 | A1 | 6/2016 | Yasin et al. | |
| 2016/0378470 | A1* | 12/2016 | Yasin | G06F 9/30076 712/226 |
| 2017/0060725 | A1* | 3/2017 | Klausner | G06F 11/3495 |
| 2017/0168833 | A1* | 6/2017 | Mericas | G06F 11/3471 |
| 2020/0242003 | A1 | 7/2020 | Merten et al. | |
| 2020/0319883 | A1 | 10/2020 | Yasin | |
| 2025/0231880 | A1* | 7/2025 | Castorina | G06F 12/0862 |

OTHER PUBLICATIONS

Yasin, Ahmad, et al., "A Top-Down Method for Performance Analysis and Counters Architecture", International Symposium for Performance Analysis of Systems and Software (ISPASS), 2014, 10 pgs.

* cited by examiner

200

210 Monitor an execution of instructions by a processor

212 Detect a retirement of a first instruction

214 Make a first determination that the first instruction is of a prefetch type

216 Based on the first determination, update a first count of one or more retirements each of a respective instruction which is of the prefetch type 218 Detect a retirement of a second instruction 220 Make a second determination that the second instruction is of an instruction type other than the prefetch type 222 Generate a signal to prevent an update of the first count based on the second determination

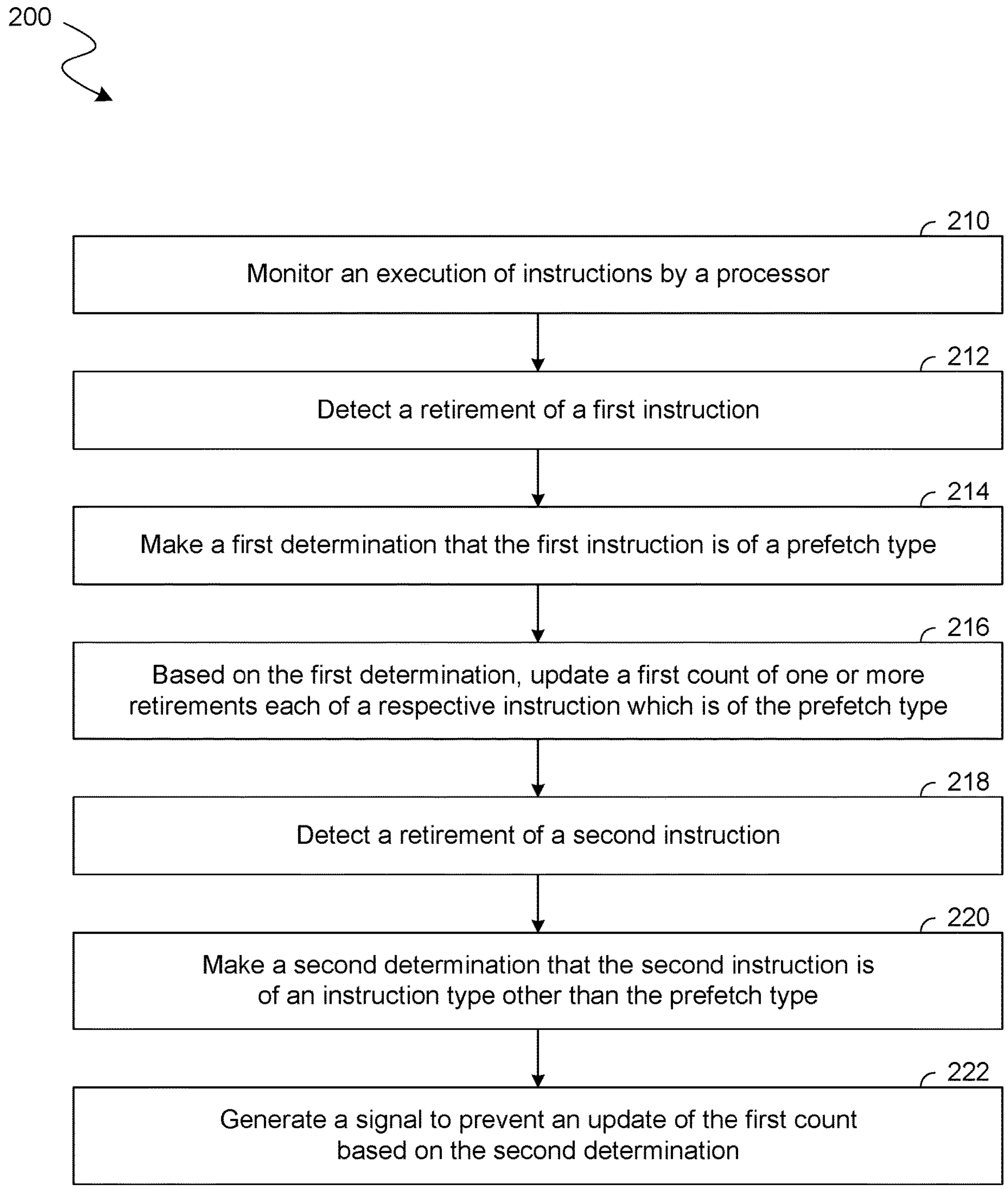

FIG. 2A

Count()
1
Instruction_x
3
402
Retirement stage 414
Processor trace unit 416
4
Address of retired Instruction_x
2
Region configuration
10
Generate interrupt, PEBS, alert
PMU 418
5
Filter process
424
9
Determine alerts
440
7
Update counters
6
Filter privilege
428
Counts exceeded
8
430
432
434
436

Count prefetch 510
On load pipe 511
SW Prefetch 512
530
TLB hit 513
TLB miss 514
Lock indicated 515
Split indicated 516
Any (prefetch) type 517
531
540
541
550
552
Count demand 520
534
On load pipe 511
SW Prefetch 512
532
TLB hit 523
TLB miss 524
Lock indicated 525
Split indicated 526
Any (demand) type 527
533
542
543

FIG. 9A

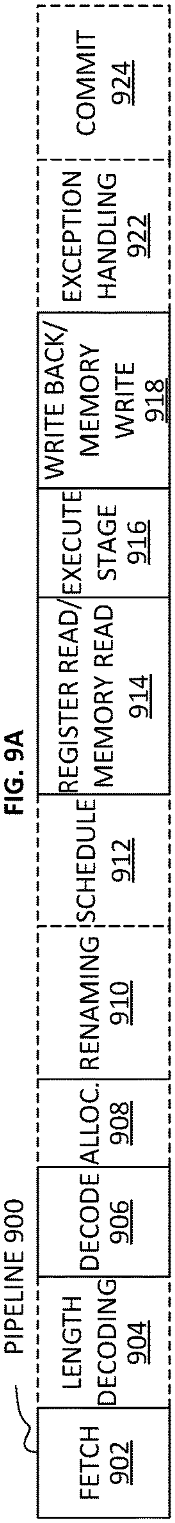

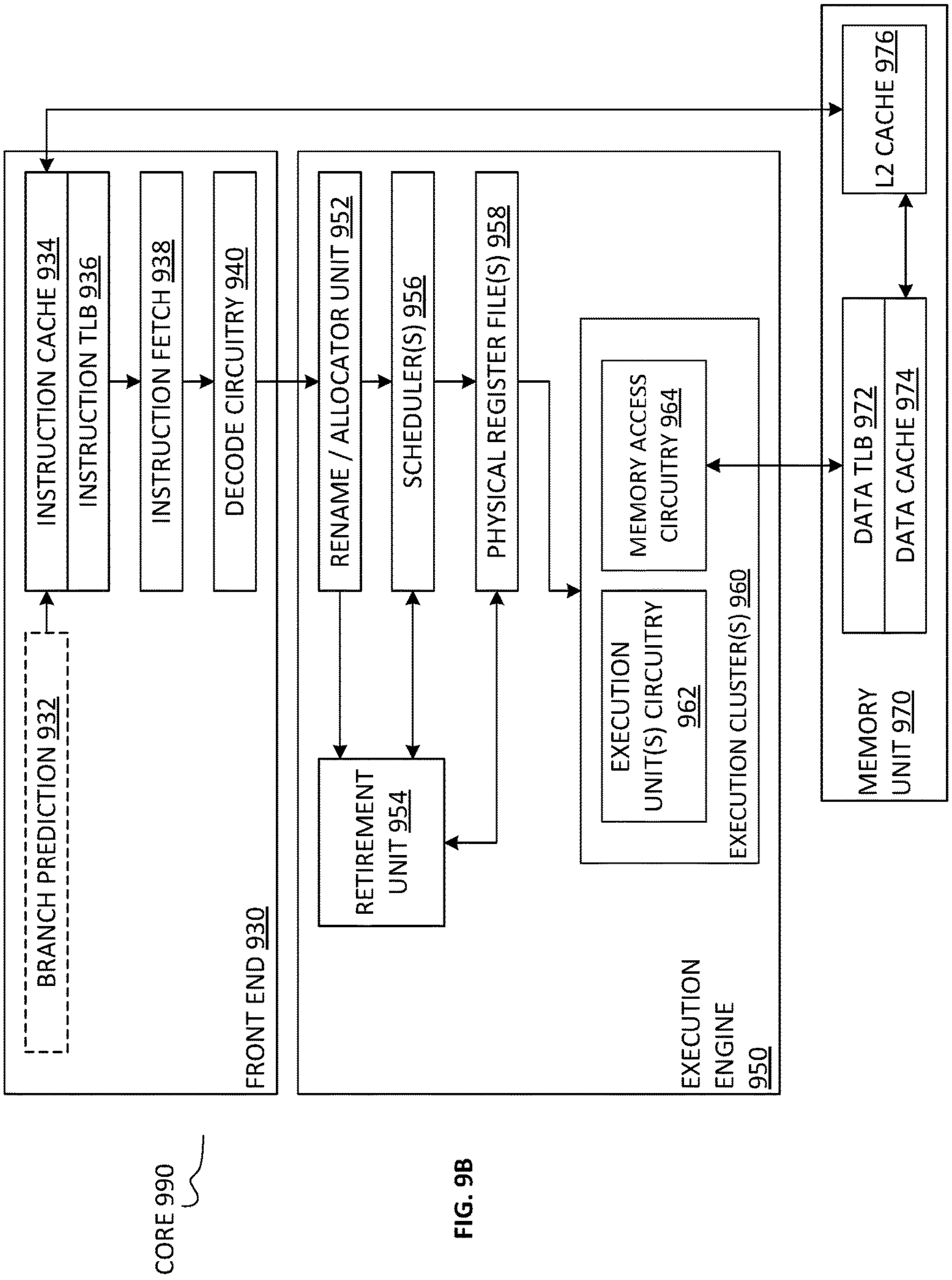

FIG. 9B

PIPELINE 900
FETCH 902
LENGTH DECODING 904
DECODE 906
ALLOC. 908
RENAMING 910
SCHEDULE 912
REGISTER READ/ MEMORY READ 914
EXECUTE STAGE 916
WRITE BACK/ MEMORY WRITE 918
EXCEPTION HANDLING 922
COMMIT 924
CORE 990
BRANCH PREDICTION 932
INSTRUCTION CACHE 934
INSTRUCTION TLB 936
INSTRUCTION FETCH 938
DECODE CIRCUITRY 940
FRONT END 930
RETIREMENT UNIT 954
RENAME / ALLOCATOR UNIT 952
SCHEDULER(S) 956
PHYSICAL REGISTER FILE(S) 958
EXECUTION UNIT(S) CIRCUITRY 962
MEMORY ACCESS CIRCUITRY 964
EXECUTION CLUSTER(S) 960
EXECUTION ENGINE 950
MEMORY UNIT 970
DATA TLB 972
DATA CACHE 974
L2 CACHE 976

Prefix 1201(A)

| 7 | 6 | 5 | 4 | 3 | 2 | 1 | 0 |
|---|---|---|---|---|---|---|---|
| 0 | 1 | 0 | 0 | W | R | X | B |

Prefix 1201(A)
Opcode 1203
MOD R/M 1302
MOD 1342 !=11
Reg 1344 rrr
R/M 1346 bbb
Rrrr
Bbbb Prefix 1201(A)
Opcode 1203
MOD R/M 1302
MOD 1342 11
Reg 1344 rrr
R/M 1346 bbb
Rrrr
Bbbb Prefix 1201(A)
Opcode 1203
MOD R/M 1302
MOD 1342 !=11
Reg 1344 rrr
R/M 1346 100
SIB 1304
SCL 1352
Index 1354 xxx
Base 1356 bbb
Rrrr
Xxxx
Bbbb Prefix 1201(A)
Opcode 1203
MOD R/M 1302
Reg 1344 bbb
Bbbb

DEVICE, METHOD, AND SYSTEM TO DETERMINE A COUNT OF RETIRED PREFETCH INSTRUCTIONS

BACKGROUND

1. Technical Field

This disclosure generally relates to processor operations and more particularly, but not exclusively, to monitor the retirement of prefetch instructions by a processor.

2. Background Art

Performance analysis provides a foundation for characterizing, debugging, and tuning a micro-architectural processor design, for finding and fixing performance bottlenecks in hardware and software, and for locating avoidable performance issues. Various processors support the generation of trace data regarding software which is being executed. Such trace data is typically used by programmers for debugging purposes, and/or by system administrators, technical support personnel or software monitoring tools to diagnose problems with installed software.

An additional debugging feature referred to as Precise Event Based Sampling (PEBS) is also provided in various types of processors. PEBS is a profiling mechanism that logs a snapshot of processor state at the time of the event, allowing users to attribute performance events to actual instruction pointers (IPs). As the computer industry progresses, the ability to analyze the performance of a micro-architecture and make changes to the microarchitecture based on that analysis becomes more complex and important.

BRIEF DESCRIPTION OF THE DRAWINGS

The various embodiments of the present invention are illustrated by way of example, and not by way of limitation, in the figures of the accompanying drawings and in which:

FIGS. 2A, 2B show flow diagrams each illustrating features of a respective method to provide information describing a retirement of instructions according to a corresponding embodiment.

FIG. 9A is a block diagram illustrating both an exemplary in-order pipeline and an exemplary register renaming, out-of-order issue/execution pipeline according to examples.

FIG. 9B is a block diagram illustrating both an exemplary example of an in-order architecture core and an exemplary register renaming, out-of-order issue/execution architecture core to be included in a processor according to examples.

DETAILED DESCRIPTION

Embodiments described herein variously provide techniques and mechanisms for circuitry of a processor to determine a count of prefetch instructions which have been retired, or are designated for retirement. In some embodiments, a first counter of a processor is dedicated to maintain up-to-date a first count of retirement events for instructions which are each of a prefetch instruction type. In one such embodiment, a second counter of said processor is operable to concurrently maintain up-to-date a second count of retirement events for other instructions including, for example, one or more instructions other than any prefetch instruction.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor that supports performance monitoring functionality.

Performance Monitoring Metrics, or Perf Metrics, are a type of feature which is implemented in some processors. This feature allows a CPU (or other processor) to expose a performance metric directly to software. By way of example, Instructions-Retired and Cycles are two commonly available performance monitoring events. In traditional performance monitoring mechanisms, software queries one or more counters which are variously configured each to maintain a respective count of events which are of a corresponding event type. The processor exposes one or more counts of performance monitoring events, which (for example) are used by software to determine metrics of processor performance.

Figure 1:
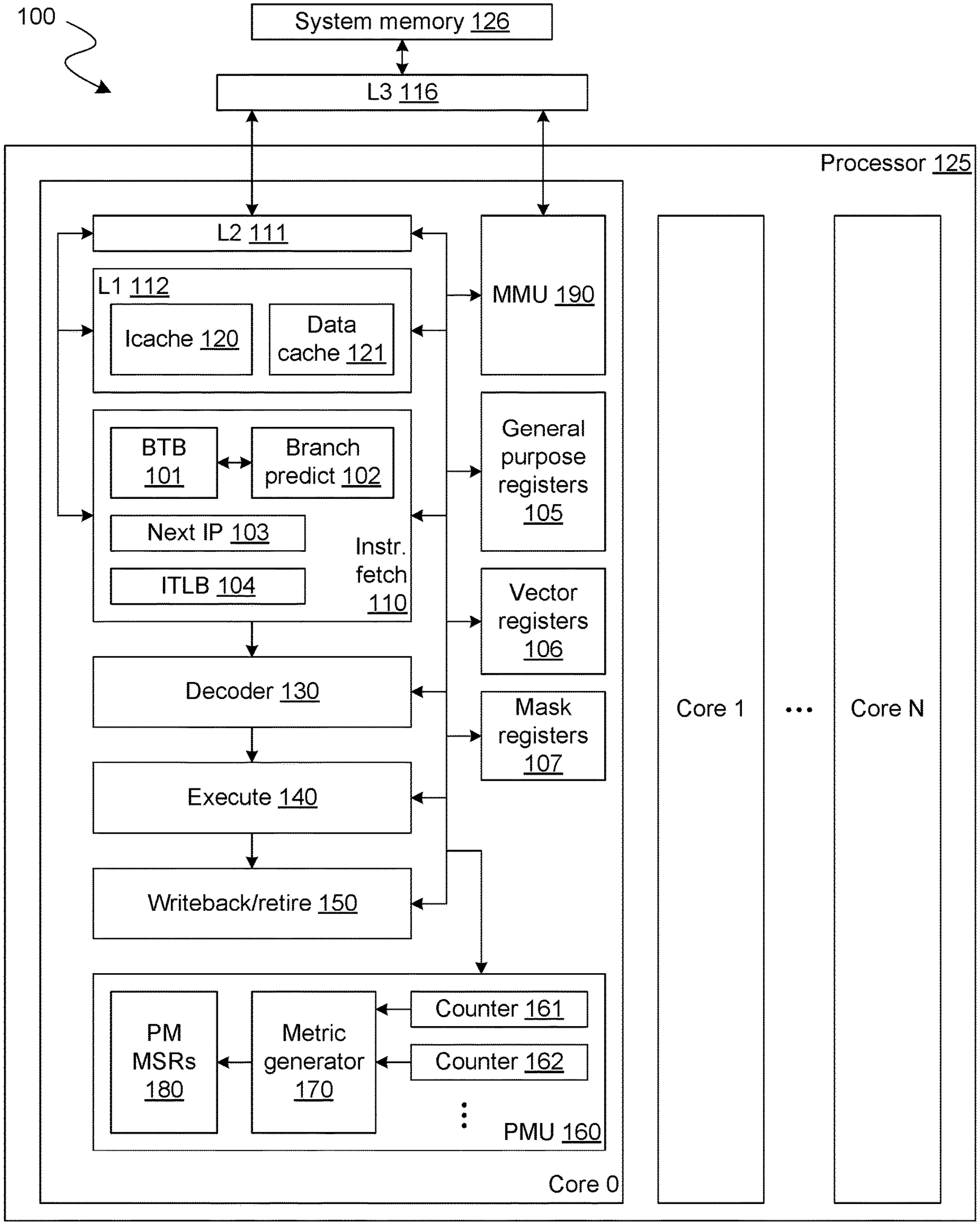
FIG. 1 shows a functional block diagram illustrating features of a system to identify counts of various respective instruction retirements according to an embodiment.

In one embodiment, a processor generates performance monitoring metrics based on collected performance monitor data and exposes the performance monitoring metrics directly to software. FIG. 1 illustrates an exemplary system 100, according to one example embodiment, which comprises a processor 125 and a system memory 126 coupled thereto via (for example) a shared Level 3 (L3) cache 116. Processor 125 comprises one or more cores (e.g., including the illustrative plurality of cores 0-N shown) each for executing a respective instruction thread. A plurality of counters (e.g., including the illustrative counters 161, 162 shown), which may include fixed function counters and/or programmable counters, may collect performance monitor data from various stages of the instruction processing pipeline such as instructions retired and, for example, a number of cycles.

A performance monitor unit (PMU) 160, illustrated with respect to Core 0, performs the techniques described herein using data such as that stored in the counters 161, 162. In particular, a performance metric generator 170 uses the performance data accumulated in the performance counters 161, 162 to generate a specific set of performance metric values, which are stored (in one embodiment) within one or more performance metric model specific registers (MSRs) 180.

While details of only a single core (Core 0) are shown in FIG. 1, it will be understood that each of one or more other cores of processor 125 may include similar components. Moreover, while the PMU 160 is illustrated as a separate unit within Core 0, components of the PMU, such as counters 161, 162 may be variously distributed at various instruction processing pipeline stages (e.g., within the retirement unit 150 to maintain a count of retired instructions). Prior to describing additional details of some embodiments, a description of the various components of the exemplary processor 125 are provided.

As mentioned, the exemplary embodiment includes a plurality of cores 0-N, each including a memory management unit 190 for performing memory operations (e.g., such as load/store operations), a set of general purpose registers (GPRs) 105, a set of vector registers 106, and a set of mask registers 107. In one embodiment, multiple vector data elements are packed into each one of the vector registers 106, which may have a 512 bit width for storing two 256 bit values, four 128 bit values, eight 64 bit values, sixteen 32 bit values, etc. However, various embodiments are not limited to any particular size/type of vector data. In one embodiment, the mask registers 107 include eight 64-bit operand mask registers used for performing bit masking operations on the values stored in the vector registers 106. However, some embodiments are not limited to any particular mask register size/type.

Each core 0-N may include a dedicated Level 1 (L1) cache 112 and Level 2 (L2) cache 111 for caching instructions and data according to a specified cache management policy. The L1 cache 112 includes a separate instruction cache 120 for storing instructions and a separate data cache 121 for storing data. The instructions and data stored within the various processor caches are managed at the granularity of cache lines which may be a fixed size (e.g., 64, 128, 512 Bytes in length). Each core of this exemplary embodiment has an instruction fetch unit 110 for fetching instructions from main memory 126 and/or a shared Level 3 (L3) cache 116; a decode unit 130 for decoding the instructions (e.g., decoding program instructions into micro-operations or "micro-operations"); an execution unit 140 for executing the instructions; and a writeback/retirement unit 150 for retiring the instructions and writing back the results.

In an embodiment, the instruction fetch unit 110 includes any of various well known components including a next instruction pointer 103 for storing the address of the next instruction to be fetched from memory 126 (or one of the caches); an instruction translation look-aside buffer (ITLB) 104 for storing a map of recently used virtual-to-physical instruction addresses to improve the speed of address translation; a branch prediction unit 102 for speculatively predicting instruction branch addresses; and branch target buffers (BTBs) 101 for storing branch addresses and target addresses. Once fetched, instructions are then streamed to the remaining stages of the instruction pipeline including the decode unit 130 for decoding the instructions to generate micro-operations (micro-operations), the execution unit 140 to execute the micro-operations, and the writeback/retirement unit 150 to retire the instructions. The structure and function of each of these units is well understood by those of ordinary skill in the art and will not be described here in detail to avoid obscuring the pertinent aspects of different embodiments.

In one embodiment, built-in metrics are specified—e.g., in a microarchitecture-specific, or alternatively, a microarchitecture-independent and/or otherwise abstracted manner—such that they can apply to an of various implementations. In particular, in one embodiment, counter 161 may count prefetch instructions which have been retired and counter 162 may count other instructions (i.e., including at least some instructions which are of a type other than a prefetch type) which have been retired.

The performance metric generator 170 may collect some or all of these values from their respective counters to generate one or more performance metric values, which it then stores in the performance monitor model specific register(s) 180. In one embodiment, software may then access the MSR values to determine the current performance metric values.

As illustrated in FIG. 1, in one embodiment, the processor 125 implements one or more internal (e.g., software invisible) counters—such as the illustrative counters 161, 162 shown—for any of various supported metrics. The internal counters 161, 162 may, for example, be microarchitecture specific and different architectures may include different numbers of them (e.g., 2, 4, 6, etc.). In one embodiment, the performance metric generator 170, which may be implemented in microcode and/or dedicated circuitry, converts these internal counters 161, 162 (and/or other counters of Core 0) to the software-visible performance metric data when requested by software. The performance monitor data may then be stored within one or more model specific register(s) 180 which are exposed to the software.

Some embodiments variously modify, expand or otherwise adapt a functionality, such as that provided in certain existing processor architectures, which facilitates the counting of events which are each of a particular event type. By way of illustration and not limitation, some embodiments variously extend a functionality—such as that provide by the MEM_INST_RETIRED event monitoring by various x86 processor architectures—to monitor retired instructions. The maintaining of a given current count of events is also referred to herein as "tracking" said count. For example, some embodiments variously maintain a current count of events which are variously referred to herein as "instruction retirement events," "instruction retirements," or (for brevity) simply "retirements." A given instruction retirement event includes the retirement of a respective instruction (e.g., a retirement by writeback/retirement unit 150), the execution of which was at least attempted—and, in some cases, completed—by one or more processor cores for which the count in question is being maintained.

In various embodiments, processor 125 supports the tracking of a count of instruction retirements which are each of a more particular sub-type of the instruction retirement type. In one such embodiment, for each instruction retirement which is counted with (or "included in") a given count, the retirement is that of a respective instruction which is of a prefetch instruction type. For example, some instruction sets (such as that for various x86 instruction set architectures) variously support some type of prefetch instruction which is to explicitly request that one or more instructions, and/or some data, are to be prefetched—e.g., from a cache, if available—for earlier retrieval, speculative execution and/or any of various other purposes. This type of prefetch instruction (or "prefetch instruction type" herein) is to be distinguished, for example, from one or more other non-prefetch types of instructions. For example, instructions of another instruction type—referred to herein as a "demand" instruction type—are executed within a predetermined instruction sequence, wherein said execution is to perform an operation other than the prefetching of other information. By way of illustration and not limitation, a load instruction (to load data from memory for use by a processor) is one example of an instruction which is of a demand instruction type.

In various embodiments, the respective retirements of some or all prefetch instructions are candidates to be at least potentially included in a count of instruction retirements. For example, the fact that a given instruction is of a prefetch instruction type at least provisionally qualifies the retirement of said instruction for inclusion in a retirement event count—e.g., wherein the retirement qualifies for further evaluation to determine whether such inclusion is to be permitted or prevented. By contrast, in some embodiments, the fact that another given instruction is of a non-prefetch instruction type (e.g., is of a demand type) precludes the retirement of said other instruction from being included in that same retirement event count.

In various embodiments, the inclusion of a given retirement in a count of prefetch instruction retirements is conditioned upon whether the retired instruction in question is of a prefetch instruction type. In some embodiments, such inclusion is further conditioned on one more other criteria (e.g., one or more "filter rules") regarding, for example, the attempted execution of the instruction in question. By way of illustration and not limitation, in some embodiments, the retirement is to be included in the count, according to one filter rule, where it is determined that the attempt to execute the instruction resulted in a hit of a translation look-aside buffer ("TLB")—e.g., a hit of ITLB 104, or a shared TLB (STLB). In another embodiment, the retirement is to be included in the count, according to an alternative filter rule, where it is instead determined that the attempt to execute the instruction resulted in a miss of the TLB. Additionally or alternatively, the retirement is to be included in the count, according to a different filter rule, where it is determined that the attempt to execute the instruction resulted in a detection of (e.g., an attempt to access) a locked object. Additionally or alternatively, the retirement is to be included in the count, according to a different filter rule, where it is determined that the attempt to execute the instruction resulted in an access to (e.g., a reading of, or alternatively, a writing of) an object which is split across multiple cache lines. In some embodiments, the inclusion of a given prefetch retirement in a count of prefetch instruction retirements is additionally or alternatively conditioned upon a privilege level or other security characteristic of a software process or other resource which includes, utilizes or is otherwise associated with the prefetch instruction.

Accordingly, some embodiments variously facilitate the provisioning of a count of some or all prefetch instruction retirements—e.g., wherein said count is exclusive of demand instruction retirements and/or other non-prefetch instruction retirements. Such embodiments thus provide a more specific type of performance monitoring information which, for example, helps programmers understand whether and/or how prefetch instructions are being (in)efficiently placed in software code.

FIG. 2A illustrates features of a method 200 which is performed with a processor to provide information describing a retirement of instructions according to an embodiment. Method 200 illustrates one example of an embodiment wherein a first count of retired first instructions is tracked in addition to a second count of retired second instructions, wherein each of the first instructions is of a prefetch instruction type, and wherein some or all of the second instructions are each of a respective type other than any prefetch instruction type. For example, method 200 is performed with processor 125, in some embodiments.

As shown in FIG. 2A, method 200 comprises (at 210) monitoring an execution of instructions by the processor. For example, in one embodiment, the monitoring at 210 includes or is otherwise based on PMU 160 receiving—e.g., from execution unit 140 or the writeback/retirement unit 150—information which specifies or otherwise indicates, for each of multiple instructions in an instruction stream, the respective status of processing of that instruction by Core 0 of processor 125. In various embodiments, the monitoring at 210 includes operations which (for example) are adapted from conventional performance monitoring techniques, which are not detailed herein to avoid obscuring said embodiments.

Method 200 further comprises (at 212) detecting a retirement of a first instruction, and making a first determination (at 214) that the first instruction is of a prefetch type. In one such embodiment, the first determination is made at 214 by circuitry of PMU 160 identifying an opcode of the first instruction as belonging to a prefetch opcode type. Based on the first determination, method 200 (at 216) updates a first count of one or more retirements each of a respective instruction which is of the prefetch type. In one illustrative embodiment, the first count is maintained by counter 161. For example, in one such embodiment, counter 161 is a fixed function counter at least insofar as it is dedicated to counting only retirement events for instructions which are each of a prefetch instruction type. However, in some embodiments, counter 161 comprises or otherwise operates based on circuitry which is (re)programmable or otherwise (re)configurable to selectively apply one or more filter rules in the counting of prefetch retirement events.

Method 200 further comprises (at 218) detecting a retirement of a second instruction, and making a second determination (at 220) that the second instruction is of an instruction type other than the prefetch type. In one such embodiment, the second determination is made at 220 by circuitry of PMU 160 identifying an opcode of the second instruction as belonging to a demand opcode type (for example).

Based on the second determination, method 200 (at 222) generates a signal to prevent an update of the first count. Accordingly, in some embodiments the first count is specific to only one or more types of prefetch instruction retirements, and does not further reflect any demand (or other non-prefetch) instruction type(s). In various embodiment, method 200—based on the second determination—further updates a second count of one or more retirements. For example, the one or more retirements indicated by the second count are each for a respective instruction which is of an instruction type other than any prefetch instruction type. For example, the second count represents a count of only demand instruction retirement events, in some embodiments. In other embodiments, the second count represents a count of instruction retirement events including both demand instruction retirement events and prefetch instruction retirement events.

In one illustrative embodiment, the second count is maintained by counter 162. For example, in one such embodiment, counter 162 is a fixed function counter at least insofar as it is dedicated to counting at least retirement events for instructions which are each of a demand instruction type. However, in some embodiments, counter 162 comprises or otherwise operates based on circuitry which is (re)programmable or otherwise (re)configurable to selectively apply one or more filter rules in the counting of retirement events.

In some embodiments, method 200 further comprises one or more operations (not shown) which provide the first count and/or the second count as an output from the processor to a memory resource—e.g., for use by a programmer, system administrator, software monitoring tool or other suitable agent. By way of illustration and not limitation, the processor outputs the first and second count in a performance monitoring report such as one which is generated in response to a predetermined trigger event including (for example) the exceeding of a threshold value by one of the first count or the second count.

Figure 2B:
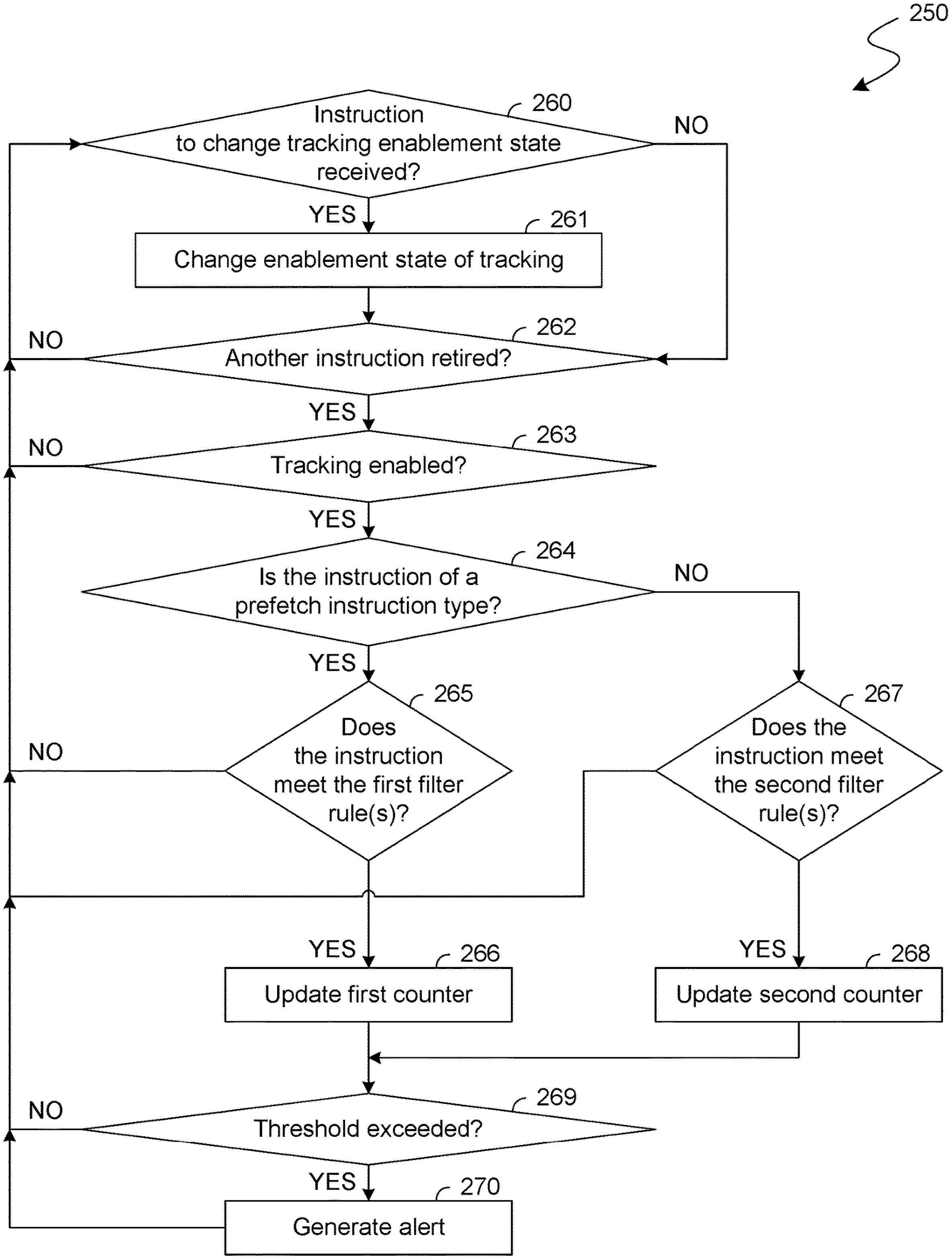

FIG. 2B illustrates features of a method 250 to provide counts of respective instruction retirements according to another embodiment. Method 250 is performed with processor 125, in some embodiments—e.g., wherein method 250 includes or is otherwise based on some or all operations of method 200.

Method 250 may begin at any suitable point and may execute in any suitable order. In one embodiment, method 250 may begin at 260. In various embodiments, method 250 may be performed during operation of a processor component such as the Core 0 of processor 125. Moreover, method 250 may be performed by any suitable combination of one or more elements of processor 125—e.g., wherein method 250 is performed with PMU 160.

At 260, it may be determined whether an instruction, to change a state of enablement—e.g., to change between an enabled state and a disabled state—for tracking instruction retirements, has been received. If such an instruction has been received, method 250 may proceed to 261. Otherwise, method 250 may proceed to 262. In one embodiment, at 261, if such an instruction has been received, a functionality to track instruction retirements may be enabled or disabled by execution of the instruction, as appropriate.

Moreover, parameters of such tracking may be enacted or released at 261. Such parameters include, for example, one or more filter rules to be applied in the determining of whether, for a given instruction (e.g., a prefetch instruction or, alternatively, a demand instruction), a retirement of said instruction is to be reflected in a particular count. In one such embodiment, a filter rule comprises one or more test criteria which are distinct from—e.g., in addition to—whether the instruction in question is retired (or is expected to be retired). Additionally or alternatively, a filter rule comprises one or more test criteria which are distinct from whether the instruction in question is of a prefetch instruction type.

By way of illustration and not limitation, such a test criteria imposes a requirement that an attempt to execute the given instruction resulted in a TLB miss (or, alternatively, resulted in a TLB hit, for example). Alternatively or in addition, such a test criteria imposes a requirement that the attempt to execute the given instruction resulted in a delay due to an object being locked. Alternatively or in addition, such a test criteria imposes a requirement that the attempt to execute the given instruction resulted in the accessing of an object which is split across multiple lines of a cache. Alternatively or in addition, such a test criteria imposes a requirement that the instruction is that of an instruction sequence which corresponds to a particular type of software process, a particular access privilege, and/or the like. In some embodiments, a filter rule imposes any of various additional or alternative test criteria for tracking instruction retirements.

At 262, it may be determined whether another instruction, which may be candidate for tracking, has been retired (or, according to some predetermined criteria, is expected to be retired). If not, method 250 may return to 260. If such an instruction has been retired, method 250 may proceed to 263.

At 263, it may be determined whether functionality to track instruction retirements has been enabled. If so, method 250 may proceed to 264. Otherwise, method 250 may proceed to 260, and the enablement state of retirement tracking is reevaluated.

At 264, in one embodiment it may be determined whether the instruction, for which a retirement was most recently detected at 262, is of a prefetch instruction type. If so, method 250 may proceed to 265 for the purpose of updating—e.g., conditionally—a first counter which is dedicated to tracking for the retirement of instructions of the prefetch instruction type.

At 265, method 250 performs an evaluation to determine whether a first one or more filter rules, which are currently-enabled, are satisfied by the prefetch instruction in question (and/or by the attempt to execute said prefetch instruction). In some embodiments, the first one or more filter rules provide additional criteria for determining whether the prefetch retirement in question is to be indicated in a first count (i.e., a count of retired prefetch instructions) that is maintained by the first counter. In another embodiment, method 250 omits the evaluating at 265—e.g., wherein no filter rules are currently enabled for the counting of prefetch instruction retirements, and wherein all prefetch retirements (e.g., at least all of those retired by a particular processor core) are to be indicated in the first count.

Where it is determined at 265 that the first one or more filter rules are satisfied, method 250 (at 266) increments or otherwise updates the first count of prefetch retirements based on the most recently detected retirement of a prefetch instruction. Where it is instead determined at 265 that the first one or more filter rules are not satisfied, method 250 returns to 260.

Where it is instead determined at 264 that the instruction in question is of a type other than the prefetch instruction type, method 250 may proceed to 267 for the purpose of updating a second counter which provides tracking for the retirement of other instructions (e.g., including one or more types of demand instructions).

At 267, method 250 performs an evaluation to determine whether a second one or more filter rules, which are currently-enabled, are satisfied by the instruction in question (and/or by the attempt to execute said instruction). In some embodiments, the second one or more filter rules provide additional criteria for determining whether the retirement in question is to be indicated in a second count (e.g., a count of retired instructions including one or more demand instructions) that is maintained by the second counter. In another embodiment, method 250 omits the evaluating at 267—e.g., wherein no filter rules are currently enabled for the second count, and wherein all demand retirements (e.g., at least all of those retired by a particular processor core) are to be indicated in the second count.

Where it is determined at 267 that the second one or more filter rules are satisfied, method 250 (at 268) increments or otherwise updates the second count of retirements based on the most recently detected retirement of an instruction. Where it is instead determined at 267 that the second one or more filter rules are not satisfied, method 250 returns to 260.

After the updating at 266 (or at 268), method 250 performs another evaluation (at 269) to determine whether the first counter, or (for example) the second counter, has exceeded a corresponding threshold which specifies or otherwise indicates a respective maximum number of instruction retirements.

If a threshold has been met, method 250 may proceed to 270. Otherwise, method 250 may proceed to 260, and the enablement state of retirement tracking is reevaluated. At 270, an alert may be generated. The alert may include an interrupt, a PEBS record, or any of various other suitable notifications. The alert may be sent, for example, to an interrupt handler or a user of a system—e.g., wherein the alert includes or otherwise communicates the respective current values of the first count and the second count.

Figure 3:
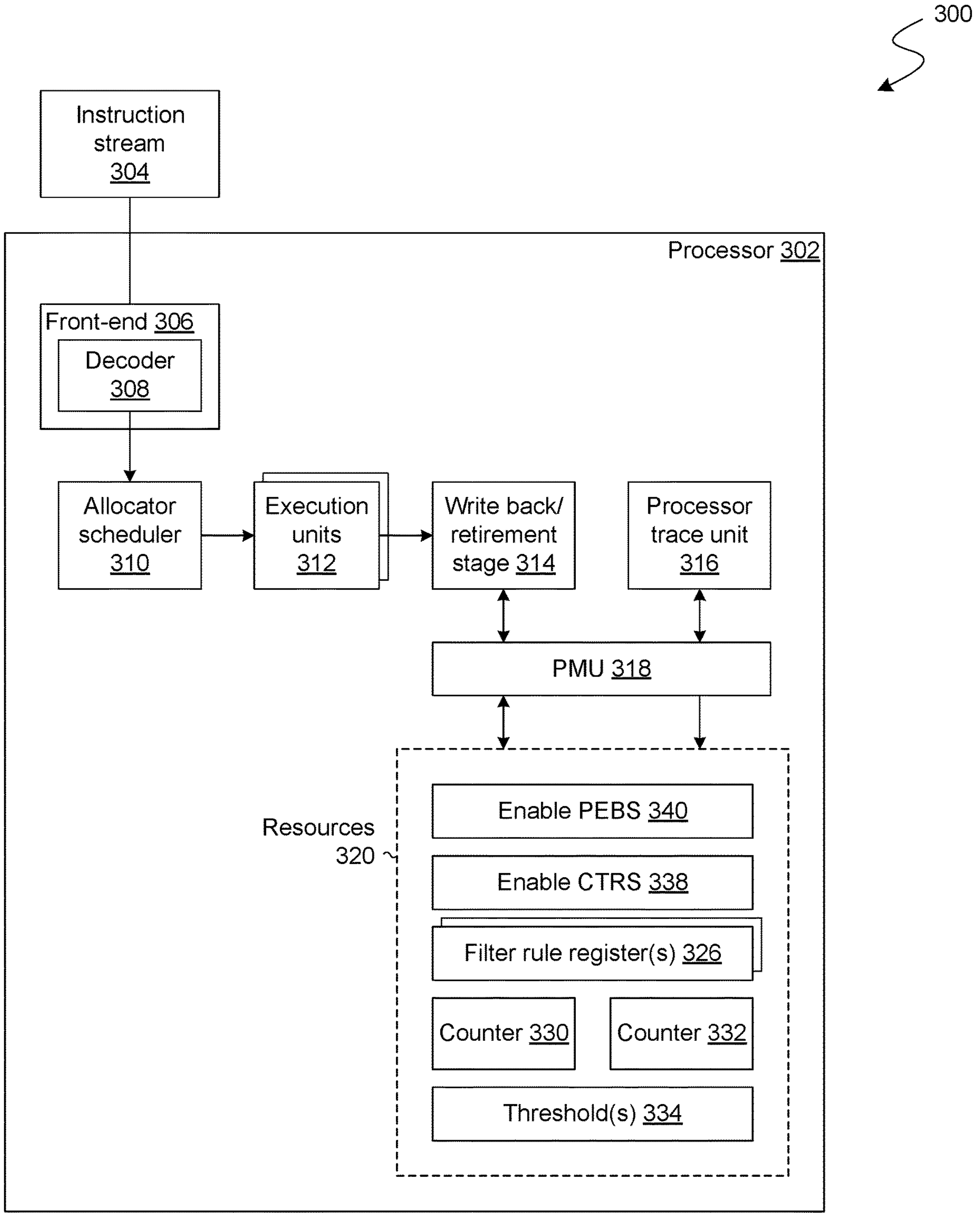
FIG. 3 shows a functional block diagram illustrating features of a system to determine a count of retired prefetch instructions according to an embodiment.

FIG. 3 is a block diagram of a portion of a system 300 for generating a count of retired prefetch instructions, according to embodiments of the present disclosure. System 300 illustrates one example embodiment wherein circuitry of a processor is operable to concurrently track both a number of retired instructions which are each of a prefetch instruction type, and an additional number of other retired instructions including (for example) one or more instructions other than any prefetch instructions. In various embodiments, system 300 provides functionality such as that of system 100—e.g., wherein operations of one of methods 200, 250 are performed with a processor of system 300.

As shown in FIG. 3, system 300 comprises a processor 302 which is configured to execute instructions of an instruction stream 304. Processor 302 may be implemented as processor 125, for example. Processor 302 may include a front end 306, which may receive and decode instructions from instruction stream 304 using a decoder 308. The decoded instructions may be dispatched, allocated, and scheduled for execution by allocator/scheduler 310, and allocated to specific execution units 312 or cores. After execution, instructions may be retired by a writeback stage or retirement unit 314. Although various operations are described herein as performed by specific components of processor 302, the functionality may be performed by any suitable portion of processor 302.

In various embodiments, processor 302 may receive, decode, schedule, execute, and retire first instructions that are each of a prefetch instruction type, wherein processor 302 is to track a count of the first instructions (or, for example, a count of a subset of the first instructions). In some embodiments, processor 302 is further to receive, decode, schedule, execute, and retire second instructions including—for example—one or more instructions which are each of a respective type other than the prefetch instruction type. In one such embodiment, processor 302 is to further track a count of the second instructions—e.g., a count of retired demand (and/or other) instructions.

By way of illustration and not limitation, processor 302 comprises circuitry—e.g., a processor trace unit (PTU) 316, a performance monitoring unit (PMU) 318, and/or the like—which is suitable to monitor the execution of instructions, and to generate one or more counts each of a respective one or more instruction retirements. In one embodiment, PMU 318 includes, is coupled to, or is otherwise operable to update some or all such counts—e.g., wherein the updating of a given count is conditioned based on one or more count filter rules. In some embodiments, PTU 316 is configured to produce status data based on some predetermined event, such as a threshold number of times that instructions of a particular instruction type have been retired.

In one embodiment, processor 302 comprises multiple counters (e.g., including the illustrative first counter 330 and second counter 332 shown) which are variously available each to maintain a respective count of events including, for example, instruction retirements. In one such embodiment, at least one counter is operated to count only retirements of prefetch instructions—e.g., wherein at least one other counter is operated to count retirements of at least some other type(s) of instructions. For example, some embodiments provide one or more fixed counters which are variously dedicated each to counting only a respective type (or types) of instructions. Some embodiments additionally or alternatively provide (re)configurable counter circuitry to selectively enable the counting of retirements for any of various combinations of one or more instruction types.

In an illustrative scenario according to one embodiment, the first counter 330 is operated to count the retirements of some or all prefetch instructions. In one such embodiment, first counter 330 is a dedicated, fixed function counter which able to count retirements for only instructions of a prefetch instruction type. In some embodiments, first counter 330 is (re)configurable to selectively provide retirement counting for any of various combinations of some or all sub-types of the prefetch instruction type.

By contrast, second counter 332 (for example) is operable to count instructions which are each of a respective type other than the prefetch instruction type. In one such embodiment, second counter 332 is a dedicated, fixed function counter which able to count retirements for only instructions of a demand instruction type (and/or other non-prefetch instruction type). In some embodiments, second counter 332 is (re)configurable to selectively provide retirement counting for any of various combinations of some or all sub-types of a demand (and/or other) instruction type.

Instructions, bootup configuration, and/or other mechanisms to enable or disable the counting of retired instructions may be implemented in any suitable manner. In one embodiment, a "count" instruction may be available for instruction on processor 302 that includes parameters identifying a given counter, and one or more types of instructions for which retirements are to be counted with that given counter. A "clear" or "disable counting" instruction may reverse the operation of the "count" function. In some embodiments, the instructions for enabling or disabling tracking may include one or more parameters to further define counter operations to be performed by processor 302.

The processor 302 may include any of various suitable number and kind of resources 320 to support the tracking of prefetch instruction retirements. Resources 320 may be variously implemented as registers, flags, data structures, bits, instructions, or other suitable mechanisms. Multiple sets of some or all of resources 320 may be included so that different types of instructions retirement events can be tracked each with a different respective count—e.g., wherein a given counter of processor 302 is (re)configurable to maintain a count in any of multiple different ways.

By way of illustration and not limitation, processor 302 comprises a mechanism to selectively enable performance monitoring such as that which enables the tracking of instruction retirements. For example, resources 320 may include an enable PEBS register 340 to enable precise event based sampling (PEBS) or any other suitable designation of data to be returned. Furthermore, the format or types of data to be provided as part of the PEBS may be specified. In addition, other actions, such as interrupts, may be specified by registers in system 300. A call stack, PerfMon framework, instruction pointer, architectural state of processor 302, and register values may be included in the PEBS, for example.

In some embodiments, resources 320 additionally or alternatively comprises an enable CTRS register 338 to identify which counters are to be used for determining one or more event counts. For example, enable CTRS register 338 identifies a particular combination of counters—e.g., including first counter 330, and second counter 332, in one example scenario—as being variously enabled each to maintain a respective event count.

In some embodiments, resources 320 additionally or alternatively comprises one or more filter rule registers 326 which are used to selectively enact or release any of various rules according to which a given instruction retirement is to be included in (or alternatively, excluded from) a particular retirement count. Filter rule register(s) 326 are updated, for example, based on one or more parameters of a "count" instruction to enable or disable the counting of retired instructions. By way of illustration and not limitation, filter rule register(s) 326 facilitate the enacting of a rule that an instruction retirement is to be counted where (for example) an attempt to execute the instruction in question resulted in a TLB miss. Alternatively or in addition, filter rule register(s) 326 facilitate the enacting of a rule that an instruction retirement is to be counted where the attempt to execute the instruction in question resulted in a TLB hit. In some embodiments, filter rule register(s) 326 facilitate the enacting of an additional or alternative rule that an instruction retirement is to be counted where the attempt to execute the given instruction resulted in a delay due to an object being locked. Alternatively or in addition, filter rule register(s) 326 facilitate the enacting of a rule that an instruction retirement is to be counted where the attempt to execute the given instruction resulted in the accessing of an object which is split across multiple lines of a cache. In some embodiments, filter rule register(s) 326 facilitate the enacting of an additional or alternative rule that an instruction retirement is to be counted where the instruction in question is that of an instruction sequence which corresponds to a particular type of software process, a particular access privilege, and/or the like. However, filter rule register(s) 326 enable any of various other rules, in different embodiments.

In an embodiment, resources 320 includes or otherwise has access to one or more thresholds 334 for determining when a first count and a second count—e.g., maintained by first counter 330 and second counter 332, respectively—are to be provided as an output to a programmer, system administrator, operating system, software monitoring tool or other suitable agent. Threshold(s) 334 are provided, for example, to a mode register based on one or more parameters of a "count" instruction to enable or disable the counting of retired instructions. In some embodiments, multiple thresholds are variously set each for a different respective counter of resources 320.

In an illustrative scenario according to one embodiment, when a given counter has reached a corresponding one of threshold(s) 334, then PMU 318 or PTU 316 may take a previously specified action. After the action is taken, the first counter 330 and second counter 332 may be cleared by PMU 318 or PTU 316, for example.

Figure 4:
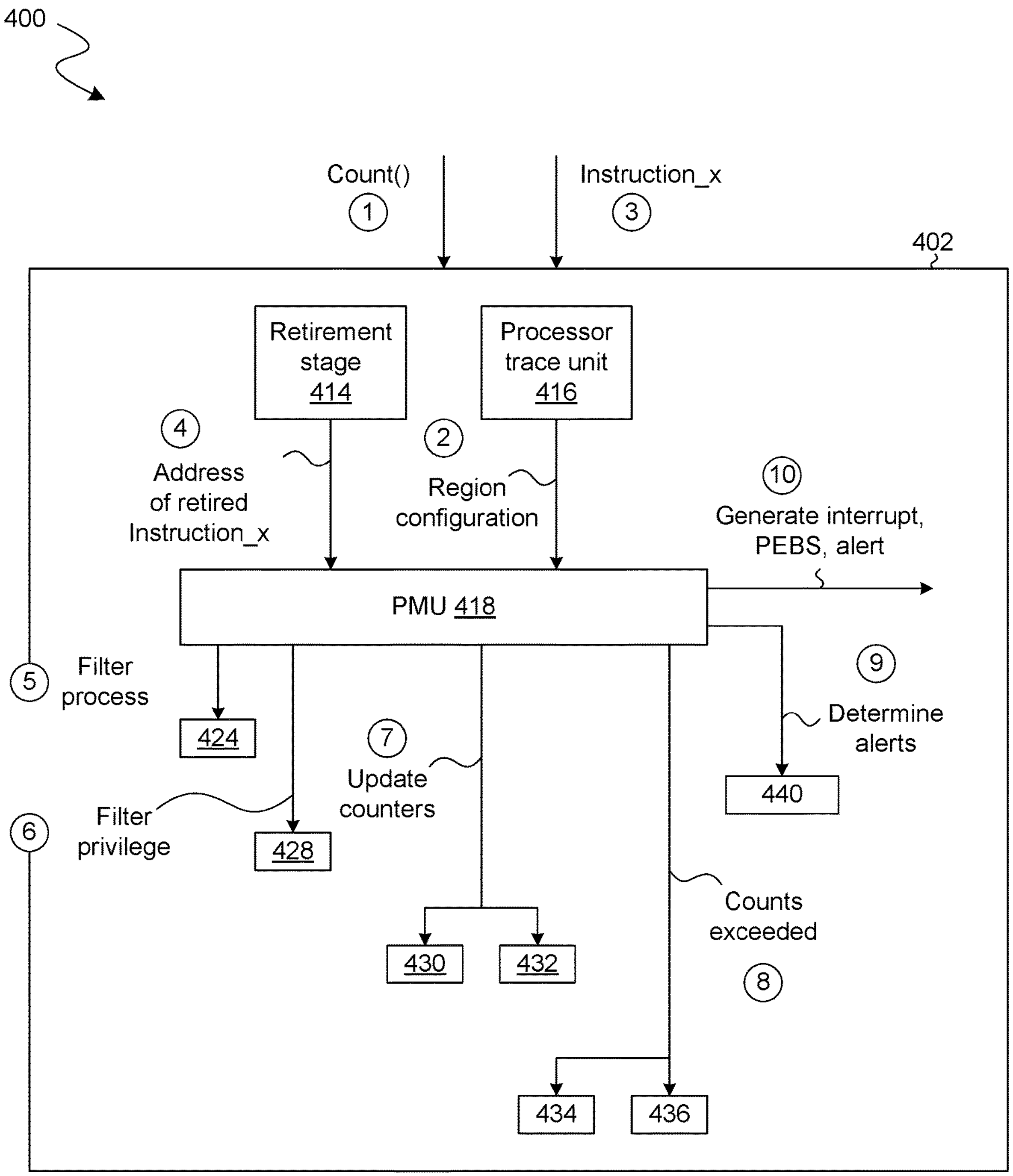
FIG. 4 shows a functional block diagram illustrating features of a system to monitor retired instructions according to an embodiment.

FIG. 4 illustrates features of a system 400 which is operable to monitor retired instructions according to an embodiment. System 400 illustrates one embodiment wherein a processor tracks the respective counts of two or more types of instruction retirements, including a count of prefetch instruction retirements, and another count of retirements including those of non-prefetch (e.g., demand) instructions. In various embodiments, system 400 provides functionality such as that of system 100 or system 300—e.g., wherein operations of one of methods 200, 250 are performed with a processor of system 400.

In the example embodiment of system 400, an instruction—to enable, disable or otherwise (re)configure a counting of instruction retirements—is received, at (1), for execution by a processor 402. At (2), the instruction enabling or disabling the counting of instruction retirements is executed and resources are set as appropriate. For example, an initialization of a first counter—which is dedicated (or alternatively, is configurable) to count only prefetch instruction retirements—may be issued from PTU 416 to PMU 418. Additionally or alternatively, an initialization of a second counter—which is dedicated (or alternatively, is configurable) to count demand (and/or other non-prefetch) instruction retirements—may be similarly issued. Furthermore, any of various filter rules and/or other parameters for event counting may be provided—e.g., as one or more parameters of the instruction received at (1).

At (3), a subsequent instruction may be received for execution at processor 402. At (4), the subsequent instruction may be executed and retired by a retirement stage 414. The address, instruction pointer, process id, priority, and other suitable information about the instruction may be provided to PMU 418.

In an embodiment, PMU 418 includes, or is coupled to, counter circuitry which applies one or more filter rules to determine whether, for a given count of retired instructions, the retirement of the subsequent instruction received at (3) is to be include in said count. In one embodiment, at (5) PMU 418 may count the retired instruction based upon the process of the instruction if retirement count has been enabled. If the retired instruction matches an identifier of processes to be tracked (such as an identifier stored in a register 424), the retirement of the instruction may remain as a candidate to possibly be counted. Otherwise the retired instruction may be filtered from inclusion in some or all retirement counts.

At (6), in one embodiment PMU 418 may additionally or alternatively determine (if privilege-based count filtering has been enabled) whether to filter a counting of the retired instruction based upon a privilege of the instruction. If the retired instruction's privilege level matches an identifier of the privilege of processes to be tracked (such as an identifier stored in a register 428), the instruction may remain as a candidate to possibly be counted. Otherwise the retired instruction may be filtered from inclusion in some or all retirement counts.

At (7), if one or more additional filter rules are currently enacted, and if the retired instruction qualifies for counting under each of said one or more additional filter rules, then in one embodiment, an appropriate count (such as one of the illustrative counts 430, 432 shown), is incremented or otherwise updated by PMU 418.

At (8), in one embodiment PMU 418 determines if the value of a given counter exceeds a corresponding threshold (such as the illustrative threshold 434 for count 430, and the threshold 436 for count 432). If such a threshold has been reached, PMU 418 may determine whether (for example) performance monitoring data is to be output, and/or whether corrective action is to be taken. By way of illustration and not limitation, at (9), in one embodiment PMU 418 determine what actions are to be taken, such as generating an interrupt, generating a PEBS record, determining what data is to be included in a PEBS record 440, or another sort of alert. At (10), the alert may be sent to an appropriate consumer, such as an interrupt handler or a user of processor 402.

Figure 5:
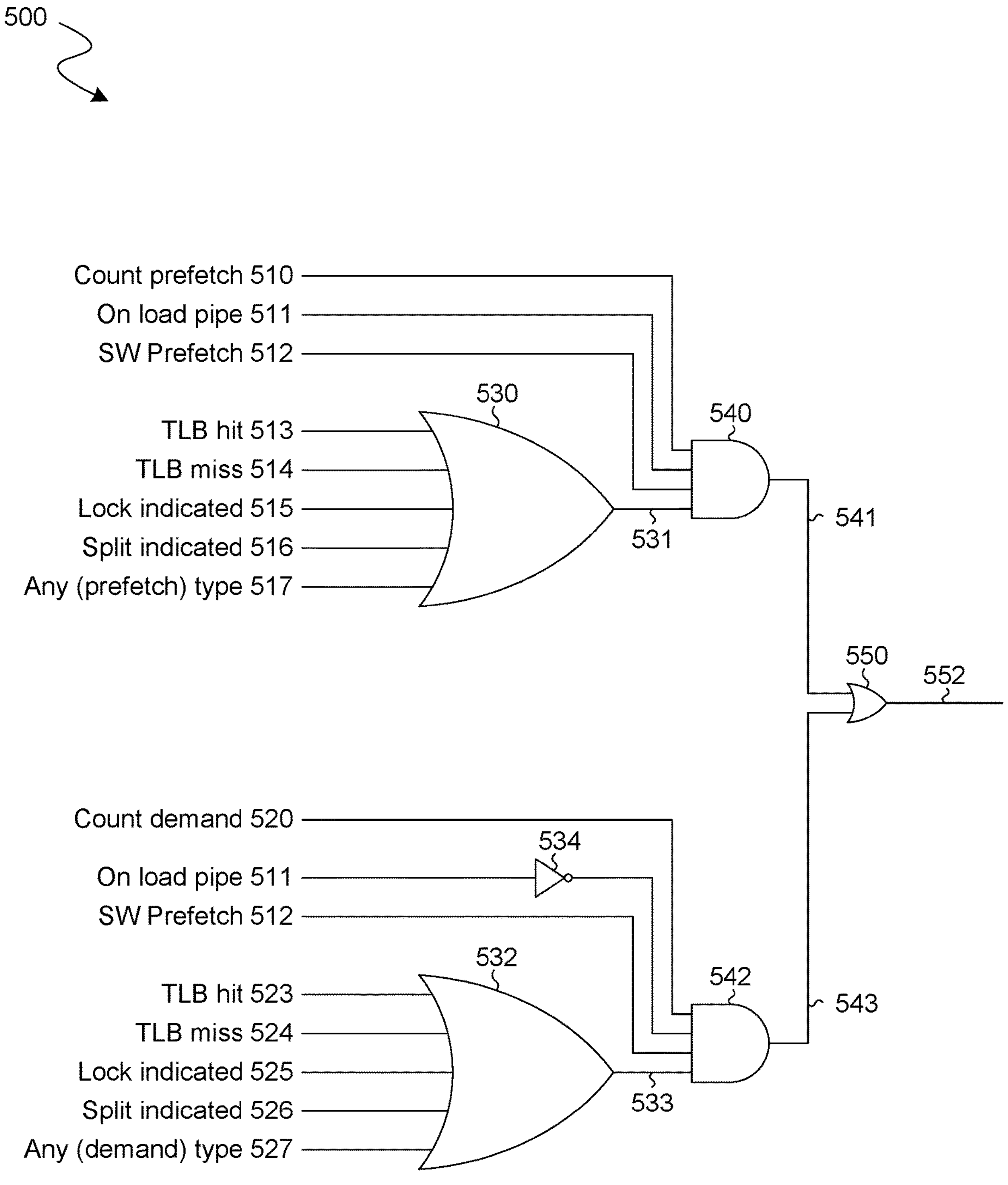
FIG. 5 shows a circuit diagram illustrating features of processor to track retired instructions according to an embodiment.

FIG. 5 illustrates features of processor circuitry 500 which is operable to track retired instructions according to an embodiment. Processor circuitry 500 provides functionality to perform operations of one of methods 200, 250 (for example)—e.g., wherein one of processors 125, 302, 402 comprises processor circuitry 500.

As shown in FIG. 5, processor circuitry 500 is coupled to receive a control signal 510 which indicates whether a counting of retired prefetch instructions (e.g., only retired prefetch instructions) is to be enabled. Furthermore, processor circuitry 500 is coupled to receive a signal 511 which indicates whether a next instruction in a pipeline of the processor has been retired, wherein said retirement is to be evaluated for possible counting with processor circuitry 500. Further still, processor circuitry 500 is coupled to receive a signal 512 which indicates whether the next retired instruction is of a prefetch type.

In one such embodiment, processor circuitry 500 further receives one or more signals (such as the illustrative signals 513-517 shown) which each indicate whether, for a given prefetch instruction under consideration, a corresponding filter rule has been satisfied for including a retirement of said prefetch instruction in a count of retired instructions. For a given one of signals 513 through 517, the signal is set to a logic low state if the corresponding filter rule is not currently enacted.

By way of illustration and not limitation, signal 513 indicates whether the retired prefetch instruction which is currently under consideration satisfies a currently-enacted count filtering rule (if any) that an attempt to execute the prefetch instruction in question resulted in a TLB hit. Alternatively or in addition, signal 514 indicates whether the retired prefetch instruction which is currently under consideration satisfies a currently-enacted count filtering rule (if any) that an attempt to execute the prefetch instruction in question resulted in a TLB miss.

In some embodiments, signal 515 indicates whether the retired prefetch instruction which is currently under consideration satisfies a currently-enacted count filtering rule (if any) that an attempt to execute the prefetch instruction in question resulted in a locked object being accessed or otherwise detected. Alternatively or in addition, signal 516 indicates whether the retired prefetch instruction which is currently under consideration satisfies a currently-enacted count filtering rule (if any) that an attempt to execute the prefetch instruction in question resulted in the accessing of an object which is split across multiple lines of a cache. In various embodiments, signal 517 indicates whether the retired prefetch instruction which is currently under consideration satisfies a currently-enacted count filtering rule (if any) that any retired prefetch instruction is to be included in the counting.

In one such embodiment, processor circuitry 500 is further coupled to receive another control signal 520 which indicates whether a counting of retired demand instructions (e.g., only retired demand instructions) is to be enabled. In one such embodiment, processor circuitry 500 further receives one or more additional signals (such as the illustrative signals 523-527 shown) which each indicate whether, for a given demand instruction under consideration, a corresponding filter rule has been satisfied for including a retirement of said demand instruction in a count of retired instructions. For a given one of signals 523 through 527, the signal is set to a logic low state if the corresponding filter rule is not currently enacted.

By way of illustration and not limitation, signal 523 indicates whether the retired demand instruction which is currently under consideration satisfies a currently-enacted count filtering rule (if any) that an attempt to execute the demand instruction in question resulted in a TLB hit. Alternatively or in addition, signal 524 indicates whether the retired demand instruction which is currently under consideration satisfies a currently-enacted count filtering rule (if any) that an attempt to execute the demand instruction in question resulted in a TLB miss.

In some embodiments, signal 525 indicates whether the retired demand instruction which is currently under consideration satisfies a currently-enacted count filtering rule (if any) that an attempt to execute the demand instruction in question resulted in a locked object being accessed or otherwise detected. Alternatively or in addition, signal 526 indicates whether the retired demand instruction which is currently under consideration satisfies a currently-enacted count filtering rule (if any) that an attempt to execute the demand instruction in question resulted in the accessing of an object which is split across multiple lines of a cache. In various embodiments, signal 527 indicates whether the retired demand instruction which is currently under consideration satisfies a currently-enacted count filtering rule (if any) that any retired demand instruction is to be included in the counting.

In the example embodiment shown, a logic gate 530 of processor circuitry 500 is operable to generate, based on signals 513-517, a signal 531 which indicates whether any currently-enacted filter rule has been satisfied by a prefetch instruction (if any) which is under consideration. Based on the signals 510-512, and on signal 531, a logic gate 540 of processor circuitry 500 generates a signal 541 to indicate whether a retired prefetch instruction (where applicable) qualifies to be included in a retirement count. Alternatively or in addition, a logic gate 532 of processor circuitry 500 is operable to generate, based on signals 523-527, a signal 533 which indicates whether any currently-enacted filter rule has been satisfied by a demand instruction (if any) which is under consideration. Based on the signals 520, 512, 533—and on an inverted version of signal 511 (provided by inverter gate 534)—a logic gate 542 of processor circuitry 500 generates a signal 543 to indicate whether a retired demand instruction (where applicable) qualifies to be included in a retirement count. In one such embodiment, a logic gate 550 generates a signal 552, based on signals 541, 543, to conditionally increment or otherwise update a count of instruction retirements.

Figure 6:
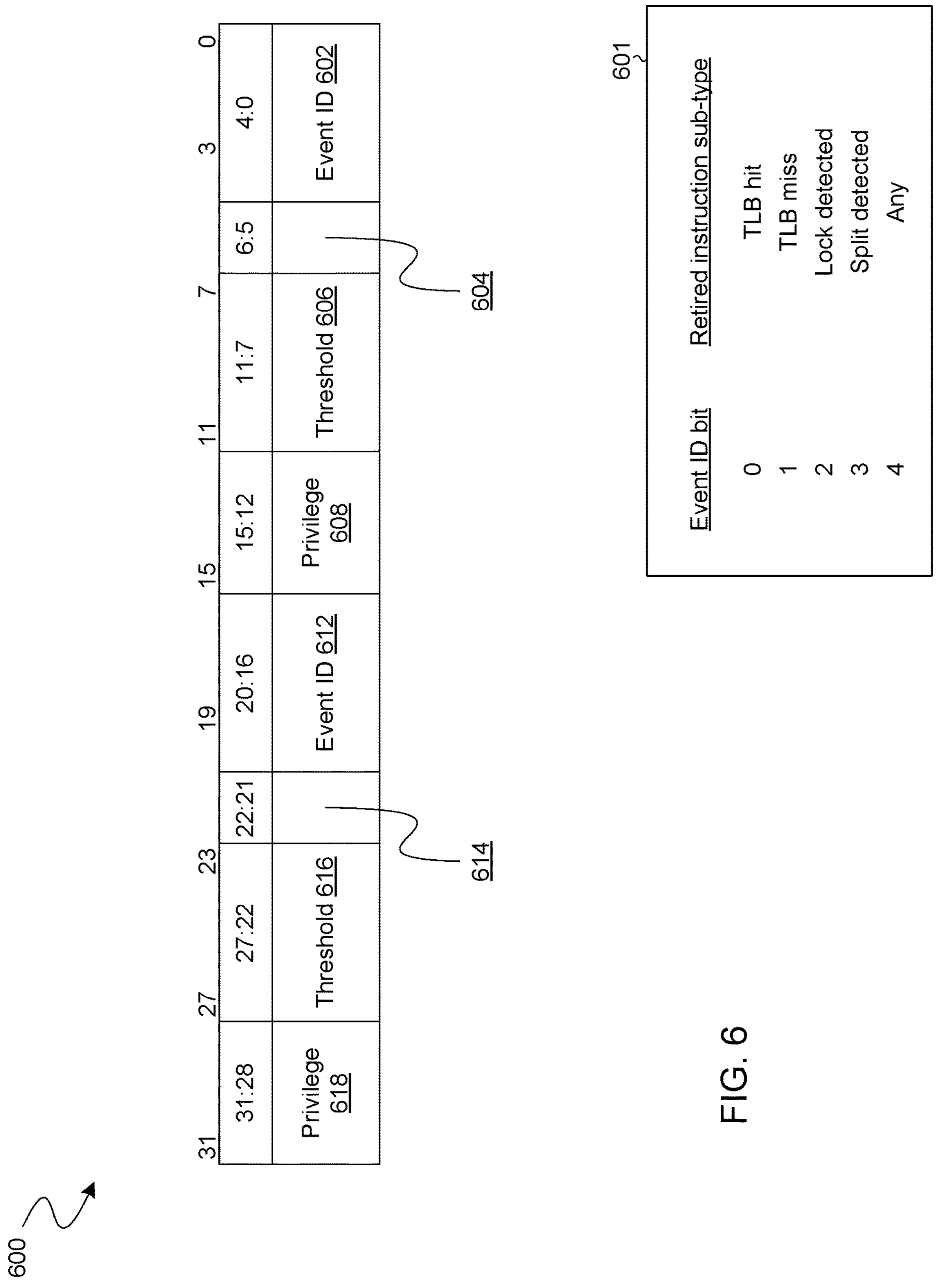
FIG. 6 shows a data format diagram illustrating features of a mode register to configure a counting of retired prefetch instructions according to an embodiment.

FIG. 6 is an illustration of an example mode register 600 to facilitate the configuring of an instruction retirement counting functionality, according to embodiments of the present disclosure. In an embodiment, mode register 600 is accessed to determine retirement counting by one of processors 125, 302, 402, and/or with processor circuitry 500—e.g., wherein operations of one of methods 200, 250 include or are otherwise based on such access.

As shown in FIG. 6, mode register 600 comprises fields to variously facilitate the selective configuration of one or more counters (in this example, up to two counters) which are each to maintain a respective count of instruction retirements. In the example embodiment shown, mode register 600 comprises first fields 602, 604, 606, 608 which correspond to a first counter, and further comprises second fields 612, 614, 616, 618 which correspond to a second counter. However, in various embodiments, mode register 600 alternatively supports the configuration of more, fewer, or different counters—e.g., wherein the particular number, sizes and types of the fields in mode register 600 are different.

By way of illustration and not limitation, field 602 provides a bitmap, or other suitable information, to specify or otherwise indicate which one or more filter rules (if any) are to be enacted to determine whether a given retirement event is to be selectively included in (or excluded from) a first count by the first counter. For example, such a bit map comprises bits each corresponding to a different respective type of event which—according to a corresponding filter rule—is required to take place if the retirement event in question is to be included in the first count. For each such bit of the bitmap, a value of the bit identifies whether the filter rule which requires the corresponding type of event is currently enacted.

In one such embodiment, a bitmap in field 602 encodes information according to a scheme such as that represented in the legend 601 shown. In an illustrative scenario according to one embodiment, bit 0 of field 602 indicates whether the retirement of an instruction which results in a TLB hit is to be included in the first count—e.g., wherein bit 1 of field 602 indicates whether the retirement of an instruction which results in a TLB miss is to be included in the first count. Furthermore, bit 2 of field 602 indicates whether the retirement of an instruction which results in the accessing (or other detection) of a locked object is to be included in the first count—e.g., wherein bit 3 of field 602 indicates whether the retirement of an instruction which results in the accessing of an object which is split across cache lines is to be included in the first count. Further still, bit 4 of field 602 indicates whether the retirement of any instruction (e.g., of a type determined by field 604) is to be included in the first count.

Field 604 indicates a particular one or more instruction types which are to be subject to evaluation based on the filter rules (if any) which are enacted based on field 602. By way of illustration and not limitation, field 604 includes encoded information to indicate whether only prefetch instruction retirements, or only demand instruction retirements, or both prefetch instruction retirements and demand instruction retirements, are candidates to potentially be included in the first count.

Field 606 indicates a first threshold count value which, if reached by the first count, is to cause the first count (and/or other suitable performance monitoring information) to be provided by the processor as an output to a programmer, system administrator, operating system, software monitoring tool or other suitable agent. Field 608 indicates a software privilege level, thread type or other information which, in some embodiments, further limits or otherwise qualifies which instruction retirements are candidates to potentially be included in the first count.

In one such embodiment, field 612 provides any of various types of information which are suitable to specify or otherwise indicate which one or more filter rules (if any) are to be enacted to determine whether a given retirement event is to be selectively included in (or excluded from) a second count by the second counter. For example, a bitmap in field 612 encodes information—e.g., according to a scheme similar to that represented in legend 601—to indicate a particular combination of filter rules (if any) which are to be applied in determining whether a given instruction retirement is to be counted with the second count.

Field 614 indicates a particular one or more instruction types which are to be subject to evaluation based on the filter rules (if any) which are enacted based on field 612. By way of illustration and not limitation, field 614 includes encoded information to indicate whether only prefetch instruction retirements, or only demand instruction retirements, or both prefetch instruction retirements and demand instruction retirements, are candidates to potentially be included in the second count.

Field 616 indicates a second threshold count value which, if reached by the second count, is to cause the second count (and/or other suitable performance monitoring information) to be provided as an output from the processor. Field 618 provides functionality (similar to that of field 608) which—based on a software privilege level, thread type or the like—further limits or otherwise qualifies which instruction retirements are candidates to potentially be included in the second count.

Figure 7:
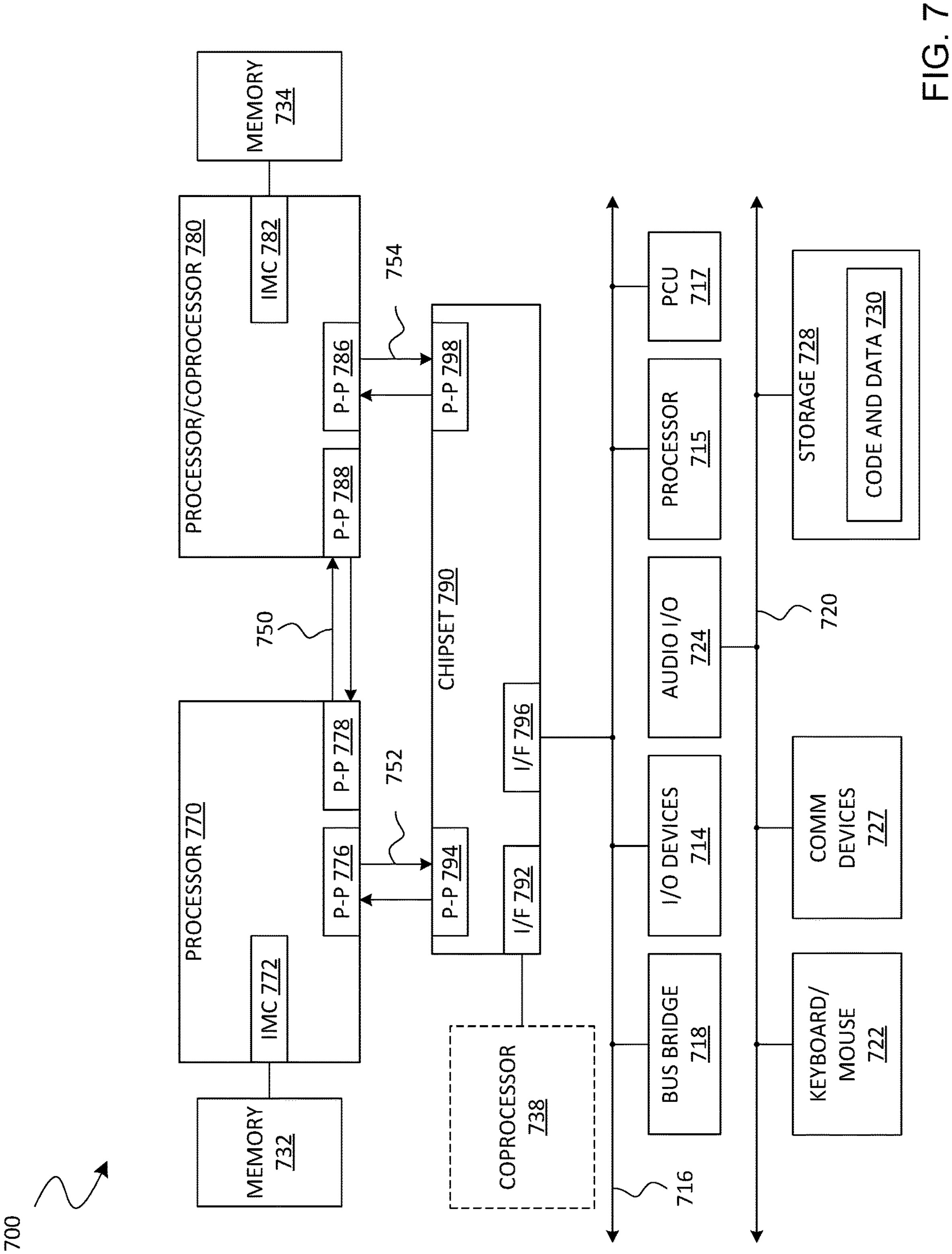
FIG. 7 illustrates an exemplary system.

FIG. 7 illustrates an exemplary system. Multiprocessor system 700 is a point-to-point interconnect system and includes a plurality of processors including a first processor 770 and a second processor 780 coupled via a point-to-point interconnect 750. In some examples, the first processor 770 and the second processor 780 are homogeneous. In some examples, first processor 770 and the second processor 780 are heterogenous. Though the exemplary system 700 is shown to have two processors, the system may have three or more processors, or may be a single processor system.

Processors 770 and 780 are shown including integrated memory controller (IMC) circuitry 772 and 782, respectively. Processor 770 also includes as part of its interconnect controller point-to-point (P-P) interfaces 776 and 778; similarly, second processor 780 includes P-P interfaces 786 and 788. Processors 770, 780 may exchange information via the point-to-point (P-P) interconnect 750 using P-P interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a chipset 790 via individual P-P interconnects 752, 754 using point to point interface circuits 776, 794, 786, 798. Chipset 790 may optionally exchange information with a coprocessor 738 via an interface 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 770, 780 or outside of both processors, yet connected with the processors via P-P interconnect, such that either or both processors' local cache information may be stored in the shared cache if a processor is placed into a low power mode.

Chipset 790 may be coupled to a first interconnect 716 via an interface 796. In some examples, first interconnect 716 may be a Peripheral Component Interconnect (PCI) interconnect, or an interconnect such as a PCI Express interconnect or another I/O interconnect. In some examples, one of the interconnects couples to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interconnect 716, along with a bus bridge 718 which couples first interconnect 716 to a second interconnect 720. In some examples, one or more additional processor(s) 715, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 716. In some examples, second interconnect 720 may be a low pin count (LPC) interconnect. Various devices may be coupled to second interconnect 720 including, for example, a keyboard and/or mouse 722, communication devices 727 and a storage circuitry 728. Storage circuitry 728 may be one or more non-transitory machine-readable storage media as described below, such as a disk drive or other mass storage device which may include instructions/code and data 730 in some examples. Further, an audio I/O 724 may be coupled to second interconnect 720. Note that other architectures than the point-to-point architecture described above are possible. For example, instead of the point-to-point architecture, a system such as multiprocessor system 700 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 8:
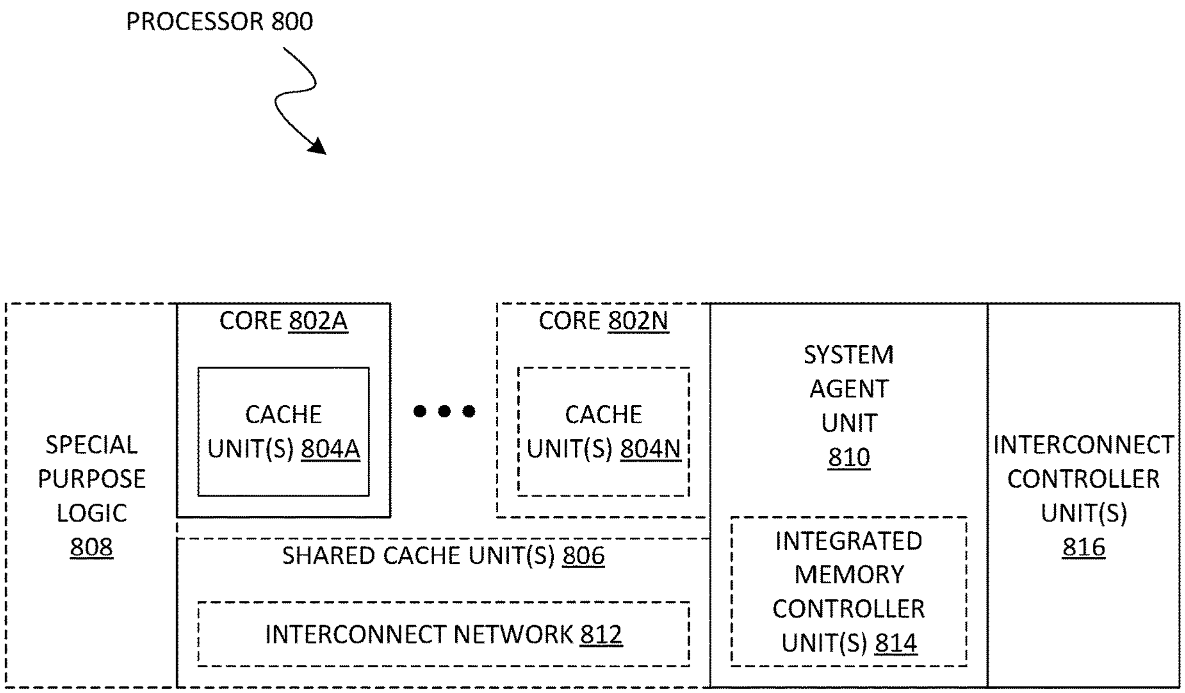
FIG. 8 illustrates a block diagram of an example processor that may have more than one core and an integrated memory controller.

FIG. 8 illustrates a block diagram of an example processor 800 that may have more than one core and an integrated memory controller. The solid lined boxes illustrate a processor 800 with a single core 802A, a system agent unit circuitry 810, a set of one or more interconnect controller unit(s) circuitry 816, while the optional addition of the dashed lined boxes illustrates an alternative processor 800 with multiple cores 802A-N, a set of one or more integrated memory controller unit(s) circuitry 814 in the system agent unit circuitry 810, and special purpose logic 808, as well as a set of one or more interconnect controller units circuitry 816. Note that the processor 800 may be one of the processors 770 or 780, or co-processor 738 or 715 of FIG. 7.

Thus, different implementations of the processor 800 may include: 1) a CPU with the special purpose logic 808 being integrated graphics and/or scientific (throughput) logic (which may include one or more cores, not shown), and the cores 802A-N being one or more general purpose cores (e.g., general purpose in-order cores, general purpose out-of-order cores, or a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 804A-N within the cores 802A-N, a set of one or more shared cache unit(s) circuitry 806, and external memory (not shown) coupled to the set of integrated memory controller unit(s) circuitry 814. The set of one or more shared cache unit(s) circuitry 806 may include one or more mid-level caches, such as level 2 (L2), level 3 (L3), level 4 (L4), or other levels of cache, such as a last level cache (LLC), and/or combinations thereof. While in some examples ring-based interconnect network circuitry 812 interconnects the special purpose logic 808 (e.g., integrated graphics logic), the set of shared cache unit(s) circuitry 806, and the system agent unit circuitry 810, alternative examples use any number of well-known techniques for interconnecting such units. In some examples, coherency is maintained between one or more of the shared cache unit(s) circuitry 806 and cores 802A-N.

In some examples, one or more of the cores 802A-N are capable of multi-threading. The system agent unit circuitry 810 includes those components coordinating and operating cores 802A-N. The system agent unit circuitry 810 may include, for example, power control unit (PCU) circuitry and/or display unit circuitry (not shown). The PCU may be or may include logic and components needed for regulating the power state of the cores 802A-N and/or the special purpose logic 808 (e.g., integrated graphics logic). The display unit circuitry is for driving one or more externally connected displays.

The cores 802A-N may be homogenous in terms of instruction set architecture (ISA). Alternatively, the cores 802A-N may be heterogeneous in terms of ISA; that is, a subset of the cores 802A-N may be capable of executing an ISA, while other cores may be capable of executing only a subset of that ISA or another ISA.

Exemplary Core Architectures—In-Order and Out-of-Order Core Block Diagram

FIG. 9A is a block diagram illustrating both an exemplary in-order pipeline and an exemplary register renaming, out-of-order issue/execution pipeline according to examples. FIG. 9B is a block diagram illustrating both an exemplary example of an in-order architecture core and an exemplary register renaming, out-of-order issue/execution architecture core to be included in a processor according to examples. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, an optional length decoding stage 904, a decode stage 906, an optional allocation (Alloc) stage 908, an optional renaming stage 910, a schedule (also known as a dispatch or issue) stage 912, an optional register read/memory read stage 914, an execute stage 916, a write back/memory write stage 918, an optional exception handling stage 922, and an optional commit stage 924. One or more operations can be performed in each of these processor pipeline stages. For example, during the fetch stage 902, one or more instructions are fetched from instruction memory, and during the decode stage 906, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 906 and the register read/memory read stage 914 may be combined into one pipeline stage. In one example, during the execute stage 916, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 9B may implement the pipeline 900 as follows: 1) the instruction fetch circuitry 938 performs the fetch and length decoding stages 902 and 904; 2) the decode circuitry 940 performs the decode stage 906; 3) the rename/allocator unit circuitry 952 performs the allocation stage 908 and renaming stage 910; 4) the scheduler(s) circuitry 956 performs the schedule stage 912; 5) the physical register file(s) circuitry 958 and the memory unit circuitry 970 perform the register read/memory read stage 914; the execution cluster(s) 960 perform the execute stage 916; 6) the memory unit circuitry 970 and the physical register file(s) circuitry 958 perform the write back/memory write stage 918; 7) various circuitry may be involved in the exception handling stage 922; and 8) the retirement unit circuitry 954 and the physical register file(s) circuitry 958 perform the commit stage 924.

FIG. 9B shows a processor core 990 including front-end unit circuitry 930 coupled to an execution engine unit circuitry 950, and both are coupled to a memory unit circuitry 970. The core 990 may be a reduced instruction set architecture computing (RISC) core, a complex instruction set architecture computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit circuitry 930 may include branch prediction circuitry 932 coupled to an instruction cache circuitry 934, which is coupled to an instruction translation lookaside buffer (TLB) 936, which is coupled to instruction fetch circuitry 938, which is coupled to decode circuitry 940. In one example, the instruction cache circuitry 934 is included in the memory unit circuitry 970 rather than the front-end circuitry 930. The decode circuitry 940 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 940 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 940 may be implemented using various different mechanisms. Examples of suitable mechanisms include, but are not limited to, look-up tables, hardware implementations, programmable logic arrays (PLAs), microcode read only memories (ROMs), etc. In one example, the core 990 includes a microcode ROM (not shown) or other medium that stores microcode for certain macroinstructions (e.g., in decode circuitry 940 or otherwise within the front end circuitry 930). In one example, the decode circuitry 940 includes a micro-operation (micro-op) or operation cache (not shown) to hold/cache decoded operations, micro-tags, or micro-operations generated during the decode or other stages of the processor pipeline 900. The decode circuitry 940 may be coupled to rename/allocator unit circuitry 952 in the execution engine circuitry 950.

The execution engine circuitry 950 includes the rename/allocator unit circuitry 952 coupled to a retirement unit circuitry 954 and a set of one or more scheduler(s) circuitry 956. The scheduler(s) circuitry 956 represents any number of different schedulers, including reservations stations, central instruction window, etc. In some examples, the scheduler(s) circuitry 956 can include arithmetic logic unit (ALU) scheduler/scheduling circuitry, ALU queues, arithmetic generation unit (AGU) scheduler/scheduling circuitry, AGU queues, etc. The scheduler(s) circuitry 956 is coupled to the physical register file(s) circuitry 958. Each of the physical register file(s) circuitry 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 958 includes vector registers unit circuitry, writemask registers unit circuitry, and scalar register unit circuitry. These register units may provide architectural vector registers, vector mask registers, general-purpose registers, etc. The physical register file(s) circuitry 958 is coupled to the retirement unit circuitry 954 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 954 and the physical register file(s) circuitry 958 are coupled to the execution cluster(s) 960. The execution cluster(s) 960 includes a set of one or more execution unit(s) circuitry 962 and a set of one or more memory access circuitry 964. The execution unit(s) circuitry 962 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 956, physical register file(s) circuitry 958, and execution cluster(s) 960 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 964). It should also be understood that where separate pipelines are used, one or more of these pipelines may be out-of-order issue/execution and the rest in-order.

In some examples, the execution engine unit circuitry 950 may perform load store unit (LSU) address/data pipelining to an Advanced Microcontroller Bus (AMB) interface (not shown), and address phase and writeback, data phase load, store, and branches.

The set of memory access circuitry 964 is coupled to the memory unit circuitry 970, which includes data TLB circuitry 972 coupled to a data cache circuitry 974 coupled to a level 2 (L2) cache circuitry 976. In one exemplary example, the memory access circuitry 964 may include a load unit circuitry, a store address unit circuit, and a store data unit circuitry, each of which is coupled to the data TLB circuitry 972 in the memory unit circuitry 970. The instruction cache circuitry 934 is further coupled to the level 2 (L2) cache circuitry 976 in the memory unit circuitry 970. In one example, the instruction cache 934 and the data cache 974 are combined into a single instruction and data cache (not shown) in L2 cache circuitry 976, a level 3 (L3) cache circuitry (not shown), and/or main memory. The L2 cache circuitry 976 is coupled to one or more other levels of cache and eventually to a main memory.

The core 990 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 990 includes logic to support a packed data instruction set architecture extension (e.g., AVX1, AVX2), thereby allowing the operations used by many multimedia applications to be performed using packed data.

Exemplary Execution Unit(s) Circuitry

Figure 10:
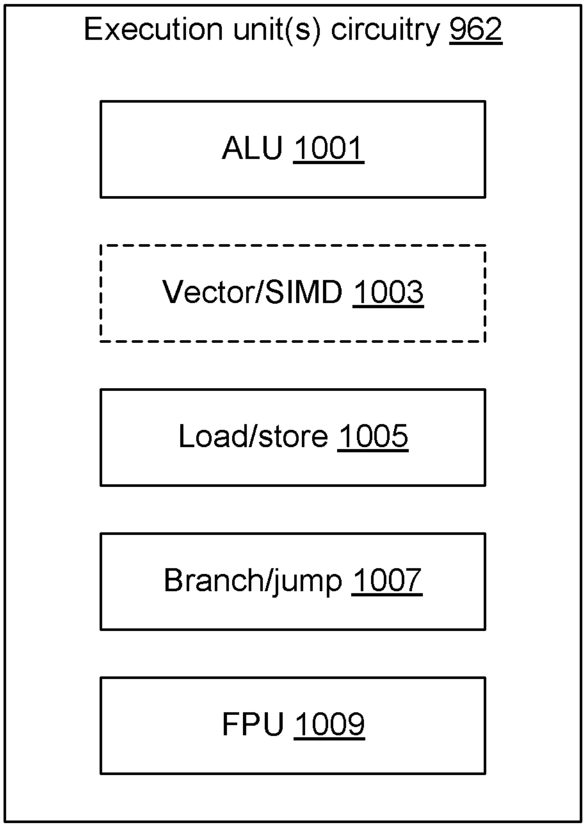
FIG. 10 illustrates examples of execution unit(s) circuitry.

FIG. 10 illustrates examples of execution unit(s) circuitry, such as execution unit(s) circuitry 962 of FIG. 9B. As illustrated, execution unit(s) circuitry 962 may include one or more ALU circuits 1001, optional vector/single instruction multiple data (SIMD) circuits 1003, load/store circuits 1005, branch/jump circuits 1007, and/or Floating-point unit (FPU) circuits 1009. ALU circuits 1001 perform integer arithmetic and/or Boolean operations. Vector/SIMD circuits 1003 perform vector/SIMD operations on packed data (such as SIMD/vector registers). Load/store circuits 1005 execute load and store instructions to load data from memory into registers or store from registers to memory. Load/store circuits 1005 may also generate addresses. Branch/jump circuits 1007 cause a branch or jump to a memory address depending on the instruction. FPU circuits 1009 perform floating-point arithmetic. The width of the execution unit(s) circuitry 962 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 11:
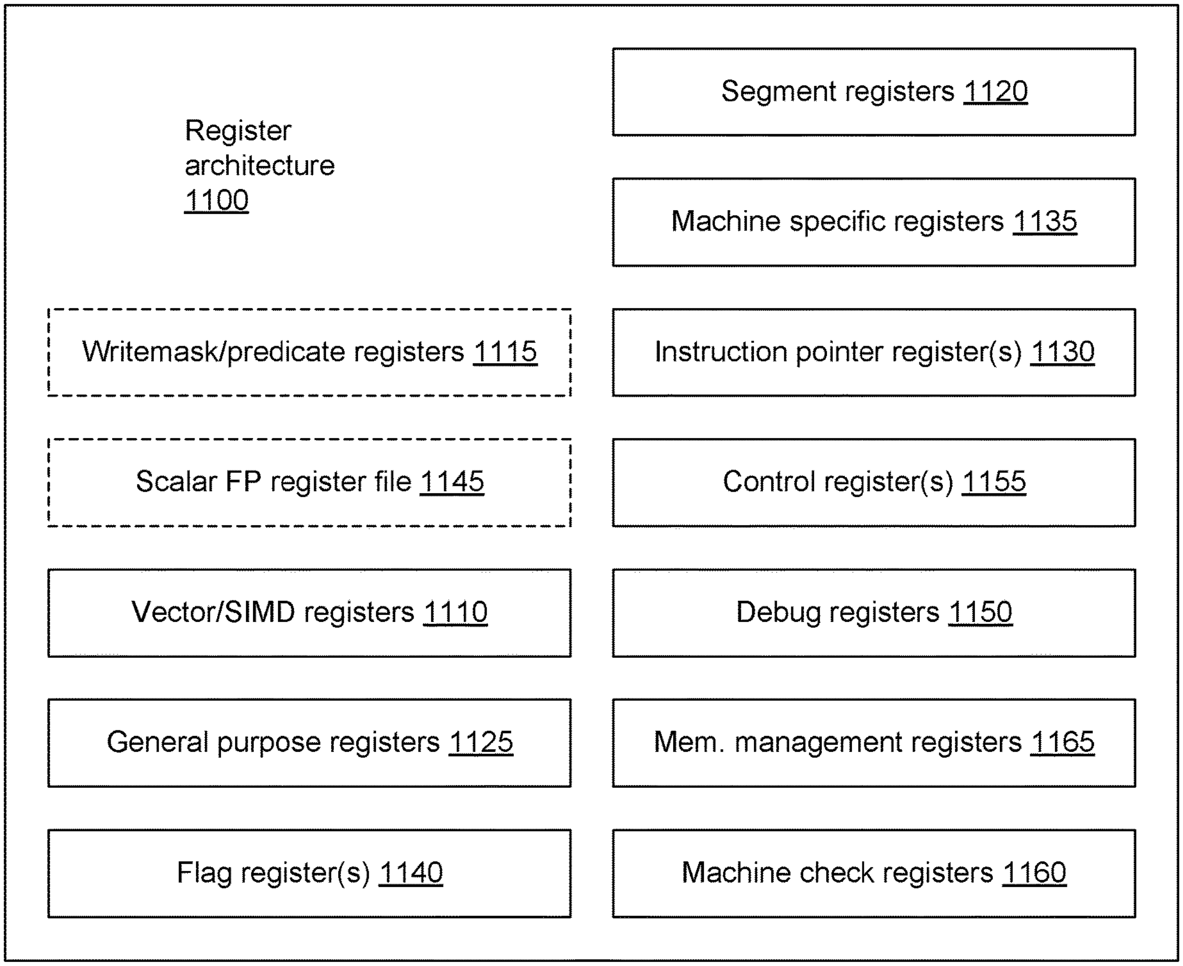
FIG. 11 is a block diagram of a register architecture according to some examples.

FIG. 11 is a block diagram of a register architecture 1100 according to some examples. As illustrated, the register architecture 1100 includes vector/SIMD registers 1110 that vary from 128-bit to 1,024 bits width. In some examples, the vector/SIMD registers 1110 are physically 512-bits and, depending upon the mapping, only some of the lower bits are used. For example, in some examples, the vector/SIMD registers 1110 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1100 includes writemask/predicate registers 1115. For example, in some examples, there are 8 writemask/predicate registers (sometimes called k0 through k7) that are each 16-bit, 32-bit, 64-bit, or 128-bit in size. Writemask/predicate registers 1115 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1115 corresponds to a data element position of the destination. In other examples, the writemask/predicate registers 1115 are scalable and consists of a set number of enable bits for a given vector element (e.g., 8 enable bits per 64-bit vector element).

The register architecture 1100 includes a plurality of general-purpose registers 1125. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1100 includes scalar floating-point (FP) register 1145 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1140 (e.g., EFLAGS, RFLAGS, etc.) store status and control information for arithmetic, compare, and system operations. For example, the one or more flag registers 1140 may store condition code information such as carry, parity, auxiliary carry, zero, sign, and overflow. In some examples, the one or more flag registers 1140 are called program status and control registers.

Segment registers 1120 contain segment points for use in accessing memory. In some examples, these registers are referenced by the names CS, DS, SS, ES, FS, and GS.

Machine specific registers (MSRs) 1135 control and report on processor performance. Most MSRs 1135 handle system-related functions and are not accessible to an application program. Machine check registers 1160 consist of control, status, and error reporting MSRs that are used to detect and report on hardware errors.

One or more instruction pointer register(s) 1130 store an instruction pointer value. Control register(s) 1155 (e.g., CR0-CR4) determine the operating mode of a processor (e.g., processor 770, 780, 738, 715, and/or 800) and the characteristics of a currently executing task. Debug registers 1150 control and allow for the monitoring of a processor or core's debugging operations.

Memory (mem) management registers 1165 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1100 may, for example, be used in physical register file(s) circuitry 958.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 12:
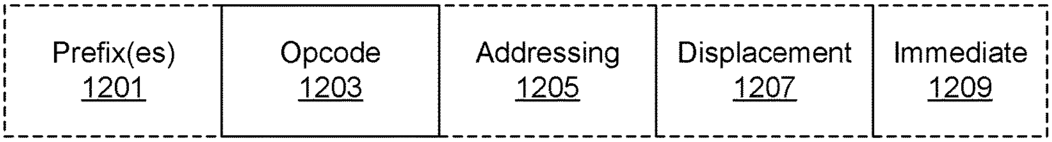
FIG. 12 illustrates examples of an instruction format.

FIG. 12 illustrates examples of an instruction format. As illustrated, an instruction may include multiple components including, but not limited to, one or more fields for: one or more prefixes 1201, an opcode 1203, addressing information 1205 (e.g., register identifiers, memory addressing information, etc.), a displacement value 1207, and/or an immediate value 1209. Note that some instructions utilize some or all of the fields of the format whereas others may only use the field for the opcode 1203. In some examples, the order illustrated is the order in which these fields are to be encoded, however, it should be appreciated that in other examples these fields may be encoded in a different order, combined, etc.

The prefix(es) field(s) 1201, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1203 is used to at least partially define the operation to be performed upon a decoding of the instruction. In some examples, a primary opcode encoded in the opcode field 1203 is one, two, or three bytes in length. In other examples, a primary opcode can be a different length. An additional 3-bit opcode field is sometimes encoded in another field.

Figure 13:
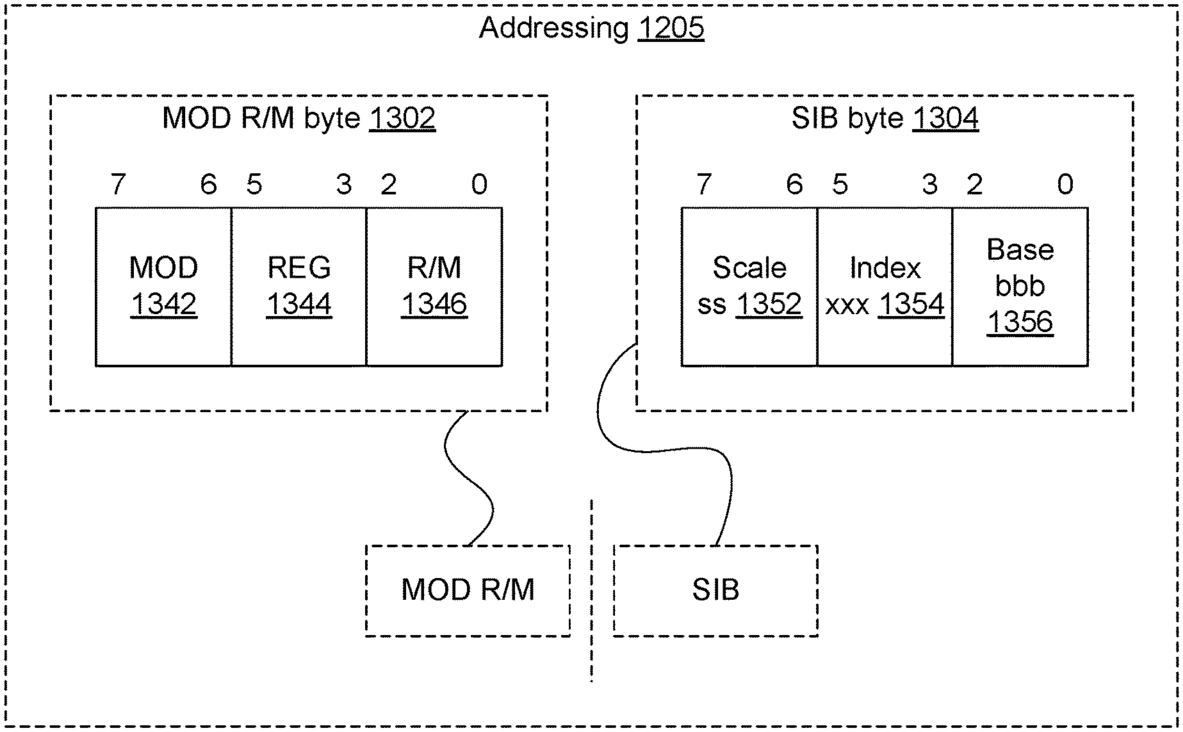
FIG. 13 illustrates examples of an addressing field.

The addressing field 1205 is used to address one or more operands of the instruction, such as a location in memory or one or more registers. FIG. 13 illustrates examples of the addressing field 1205. In this illustration, an optional ModR/M byte 1302 and an optional Scale, Index, Base (SIB) byte 1304 are shown. The ModR/M byte 1302 and the SIB byte 1304 are used to encode up to two operands of an instruction, each of which is a direct register or effective memory address. Note that each of these fields are optional in that not all instructions include one or more of these fields. The MOD R/M byte 1302 includes a MOD field 1342, a register (reg) field 1344, and R/M field 1346.

The content of the MOD field 1342 distinguishes between memory access and non-memory access modes. In some examples, when the MOD field 1342 has a binary value of 11 (11b), a register-direct addressing mode is utilized, and otherwise register-indirect addressing is used.

The register field 1344 may encode either the destination register operand or a source register operand, or may encode an opcode extension and not be used to encode any instruction operand. The content of register index field 1344, directly or through address generation, specifies the locations of a source or destination operand (either in a register or in memory). In some examples, the register field 1344 is supplemented with an additional bit from a prefix (e.g., prefix 1201) to allow for greater addressing.

The R/M field 1346 may be used to encode an instruction operand that references a memory address or may be used to encode either the destination register operand or a source register operand. Note the R/M field 1346 may be combined with the MOD field 1342 to dictate an addressing mode in some examples.

The SIB byte 1304 includes a scale field 1352, an index field 1354, and a base field 1356 to be used in the generation of an address. The scale field 1352 indicates scaling factor. The index field 1354 specifies an index register to use. In some examples, the index field 1354 is supplemented with an additional bit from a prefix (e.g., prefix 1201) to allow for greater addressing. The base field 1356 specifies a base register to use. In some examples, the base field 1356 is supplemented with an additional bit from a prefix (e.g., prefix 1201) to allow for greater addressing. In practice, the content of the scale field 1352 allows for the scaling of the content of the index field 1354 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1207 provides this value. Additionally, in some examples, a displacement factor usage is encoded in the MOD field of the addressing field 1205 that indicates a compressed displacement scheme for which a displacement value is calculated and stored in the displacement field 1207.

In some examples, an immediate field 1209 specifies an immediate value for the instruction. An immediate value may be encoded as a 1-byte value, a 2-byte value, a 4-byte value, etc.

Figure 14:
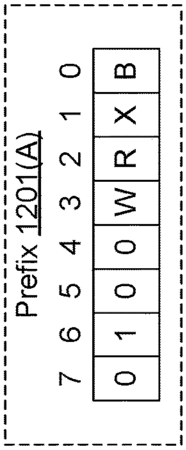
FIG. 14 illustrates examples of a first prefix.

FIG. 14 illustrates examples of a first prefix 1201(A). In some examples, the first prefix 1201(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1201(A) may specify up to three registers using 3-bit fields depending on the format: 1) using the reg field 1344 and the R/M field 1346 of the Mod R/M byte 1302; 2) using the Mod R/M byte 1302 with the SIB byte 1304 including using the reg field 1344 and the base field 1356 and index field 1354; or 3) using the register field of an opcode.

In the first prefix 1201(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1344 and MOD R/M R/M field 1346 alone can each only address 8 registers.

In the first prefix 1201(A), bit position 2 (R) may be an extension of the MOD R/M reg field 1344 and may be used to modify the ModR/M reg field 1344 when that field encodes a general-purpose register, a 64-bit packed data register (e.g., a SSE register), or a control or debug register. R is ignored when Mod R/M byte 1302 specifies other registers or defines an extended opcode.

Bit position 1 (X) may modify the SIB byte index field 1354.

Bit position 0 (B) may modify the base in the Mod R/M R/M field 1346 or the SIB byte base field 1356; or it may modify the opcode register field used for accessing general purpose registers (e.g., general purpose registers 1125).

Figure 15A:
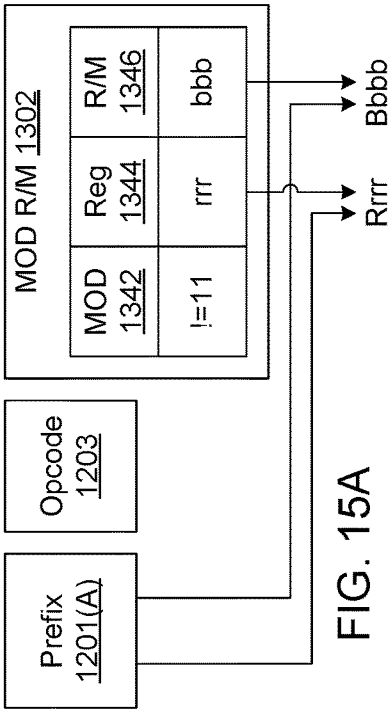
FIGS. 15A-D illustrate examples of how the R, X, and B fields of the first prefix in FIG. 14 are used.
Figure 15B:
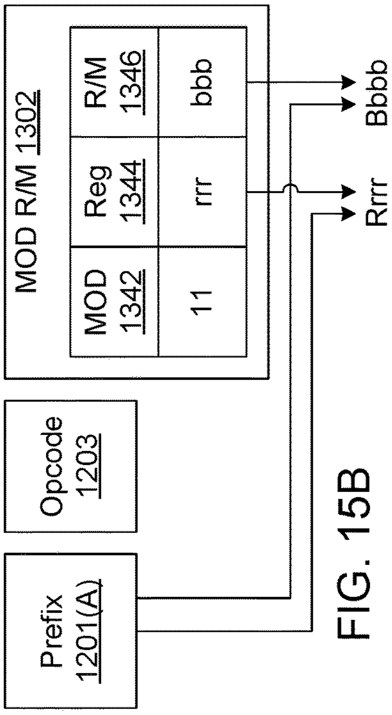
Figure 15C:
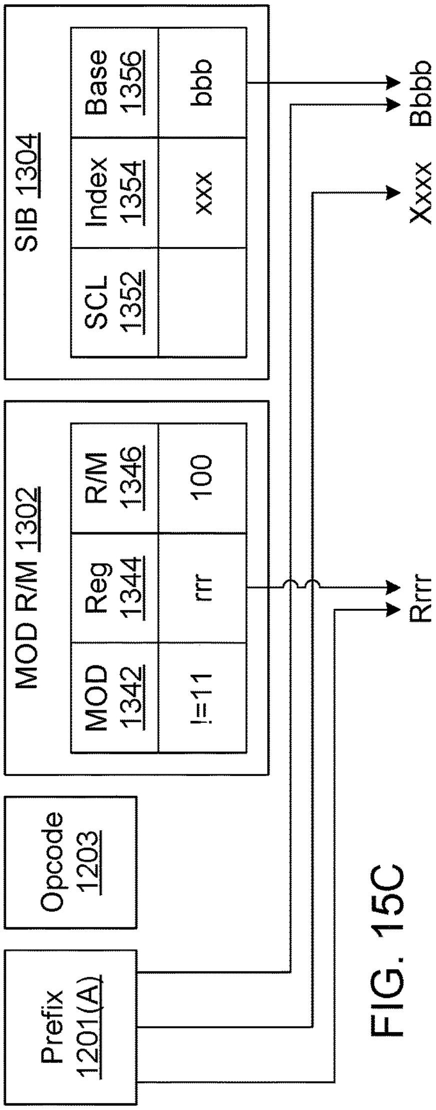
Figure 15D:
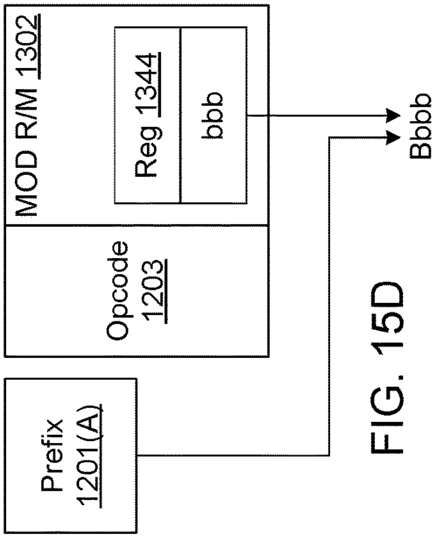

FIGS. 15A-D illustrate examples of how the R, X, and B fields of the first prefix 1201(A) are used. FIG. 15A illustrates R and B from the first prefix 1201(A) being used to extend the reg field 1344 and R/M field 1346 of the MOD R/M byte 1302 when the SIB byte 13 04 is not used for memory addressing. FIG. 15B illustrates R and B from the first prefix 1201(A) being used to extend the reg field 1344 and R/M field 1346 of the MOD R/M byte 1302 when the SIB byte 13 04 is not used (register-register addressing). FIG. 15C illustrates R, X, and B from the first prefix 1201(A) being used to extend the reg field 1344 of the MOD R/M byte 1302 and the index field 1354 and base field 1356 when the SIB byte 13 04 being used for memory addressing. FIG. 15D illustrates B from the first prefix 1201(A) being used to extend the reg field 1344 of the MOD R/M byte 1302 when a register is encoded in the opcode 1203.

Figure 16A:
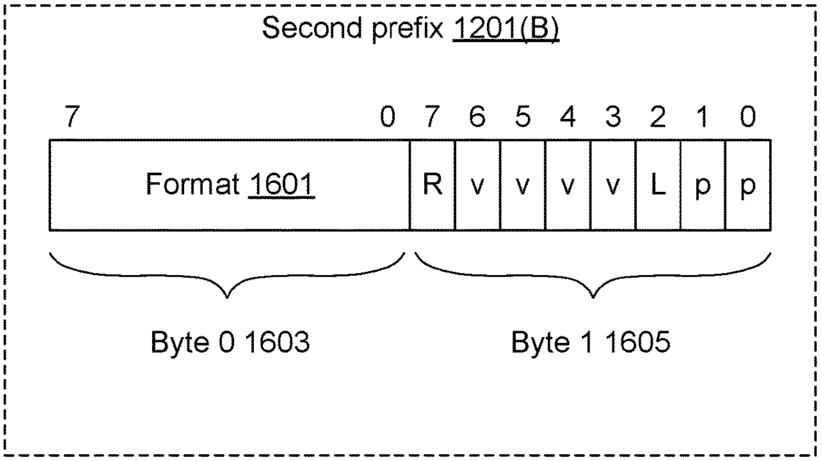
FIGS. 16A-B illustrate examples of a second prefix.
Figure 16B:
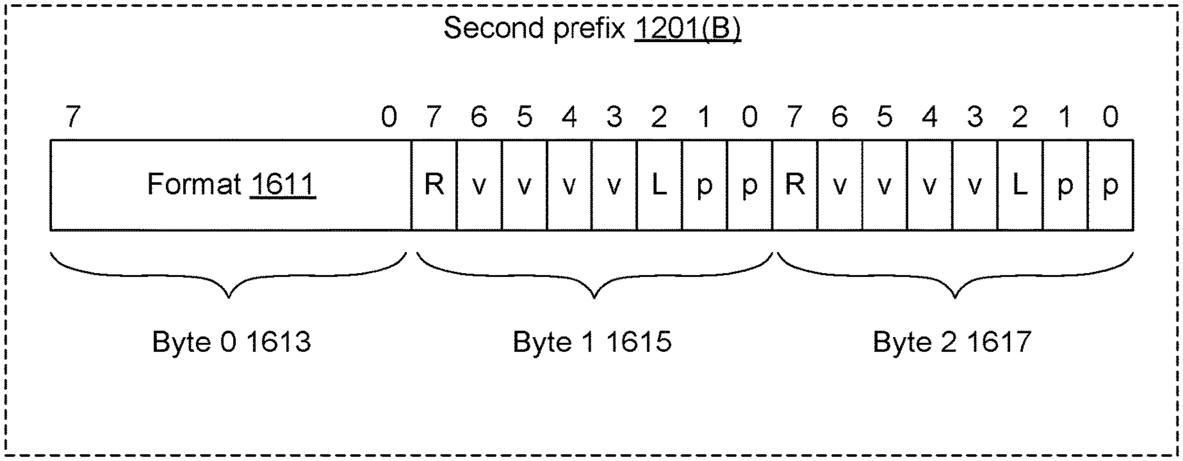

FIGS. 16A-B illustrate examples of a second prefix 1201 (B). In some examples, the second prefix 1201(B) is an example of a VEX prefix. The second prefix 1201(B) encoding allows instructions to have more than two operands, and allows SIMD vector registers (e.g., vector/SIMD registers 1110) to be longer than 64-bits (e.g., 128-bit and 256-bit). The use of the second prefix 1201(B) provides for three-operand (or more) syntax. For example, previous two-operand instructions performed operations such as A=A+B, which overwrites a source operand. The use of the second prefix 1201(B) enables operands to perform nondestructive operations such as A=B+C.

In some examples, the second prefix 1201(B) comes in two forms—a two-byte form and a three-byte form. The two-byte second prefix 1201(B) is used mainly for 128-bit, scalar, and some 256-bit instructions; while the three-byte second prefix 1201(B) provides a compact replacement of the first prefix 1201(A) and 3-byte opcode instructions.

FIG. 16A illustrates examples of a two-byte form of the second prefix 1201(B). In one example, a format field 1601 (byte 0 1603) contains the value C5H. In one example, byte 1 1605 includes a "R" value in bit[7]. This value is the complement of the "R" value of the first prefix 1201(A).

Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346 and the Mod R/M reg field 1344 encode three of the four operands. Bits[7:4] of the immediate 1209 are then used to encode the third source register operand.

FIG. 16B illustrates examples of a three-byte form of the second prefix 1201(B). In one example, a format field 1611 (byte 0 1613) contains the value C4H. Byte 1 1615 includes in bits[7:5] "R," "X," and "B" which are the complements of the same values of the first prefix 1201(A). Bits[4:0] of byte 1 1615 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1617 is used similar to W of the first prefix 1201(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346, and the Mod R/M reg field 1344 encode three of the four operands. Bits[7:4] of the immediate 1209 are then used to encode the third source register operand.

Figure 17:
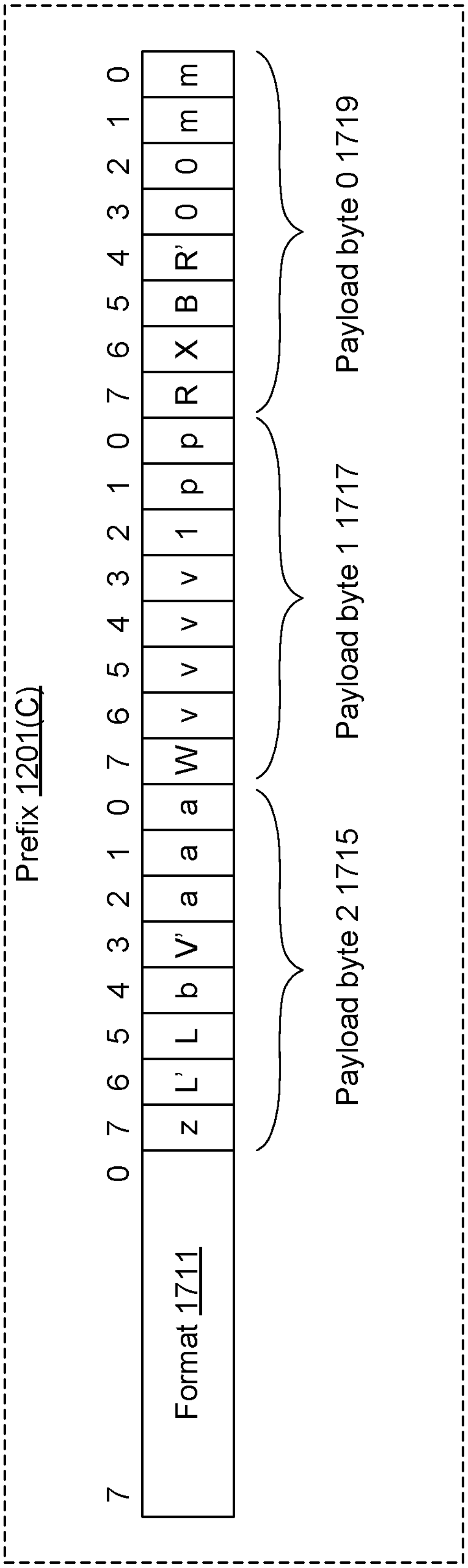
FIG. 17 illustrates examples of a third prefix.

FIG. 17 illustrates examples of a third prefix 1201(C). In some examples, the first prefix 1201(A) is an example of an EVEX prefix. The third prefix 1201(C) is a four-byte prefix.

The third prefix 1201(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 11) or predication utilize this prefix. Opmask register allow for conditional processing or selection control. Opmask instructions, whose source/destination operands are opmask registers and treat the content of an opmask register as a single value, are encoded using the second prefix 1201(B).

The third prefix 1201(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1201(C) is a format field 1711 that has a value, in one example, of 62H. Subsequent bytes are referred to as payload bytes 1715-1719 and collectively form a 24-bit value of P[23:0] providing specific capability in the form of one or more fields (detailed herein).

In some examples, P[1:0] of payload byte 1719 are identical to the low two mmmmm bits. P[3:2] are reserved in some examples. Bit P[4] (R') allows access to the high 16 vector register set when combined with P[7] and the ModR/M reg field 1344. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1344 and ModR/M R/M field 1346. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1201(A) and second prefix 1201(B) and may serve as an opcode extension bit or operand size promotion.

P[18:16] specify the index of a register in the opmask (writemask) registers (e.g., writemask/predicate registers 1115). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1201(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | 2nd Source |
| RM | ModR/M R/M | k0-k7 | 1st Source |
| {k1] | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
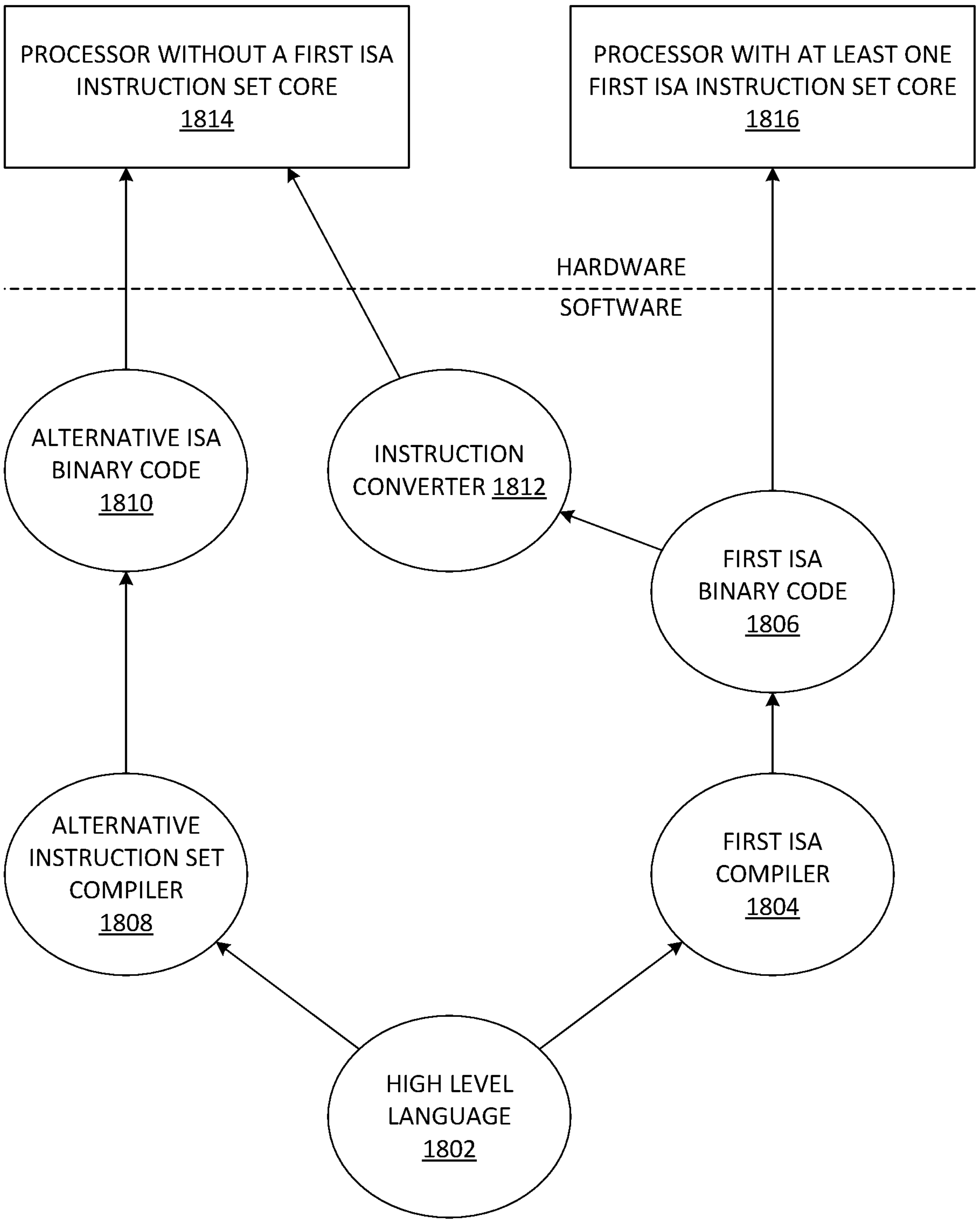
FIG. 18 is a block diagram illustrating the use of a software instruction converter to convert binary instructions in a source instruction set architecture to binary instructions in a target instruction set architecture according to examples.

FIG. 18 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 18 shows a program in a high-level language 1802 may be compiled using a first ISA compiler 1804 to generate first ISA binary code 1806 that may be natively executed by a processor with at least one first instruction set architecture core 1816. The processor with at least one first ISA instruction set architecture core 1816 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1804 represents a compiler that is operable to generate first ISA binary code 1806 (e.g., object code) that can, with or without additional linkage processing, be executed on the processor with at least one first ISA instruction set architecture core 1816. Similarly, FIG. 18 shows the program in the high-level language 1802 may be compiled using an alternative instruction set architecture compiler 1808 to generate alternative instruction set architecture binary code 1810 that may be natively executed by a processor without a first ISA instruction set architecture core 1814. The instruction converter 1812 is used to convert the first ISA binary code 1806 into code that may be natively executed by the processor without a first ISA instruction set architecture core 1814. This converted code is not necessarily to be the same as the alternative instruction set architecture binary code 1810; however, the converted code will accomplish the general operation and be made up of instructions from the alternative instruction set architecture. Thus, the instruction converter 1812 represents software, firmware, hardware, or a combination thereof that, through emulation, simulation or any other process, allows a processor or other electronic device that does not have a first ISA instruction set architecture processor or core to execute the first ISA binary code 1806.

In one or more first embodiments, a processor comprises performance monitor circuitry to monitor an execution of instructions by the processor, wherein the performance monitor circuitry is to detect a first retirement of a first instruction, and to detect a second retirement of a second instruction, counter circuitry coupled to the performance monitor circuitry, wherein the counter circuitry is to make a first determination that the first instruction is of a prefetch type, based on the first determination, update a first count of one or more retirements each of a respective instruction which is of the prefetch type, make a second determination that the second instruction is of an instruction type other than the prefetch type, and generate a signal to prevent an update of the first count based on the second determination.

In one or more second embodiments, further to the first embodiment, based on the second determination, the counter circuitry is further to update a second count of one or more other retirements.

In one or more third embodiments, further to the second embodiment, the one or more other retirements are each of a respective instruction type other than the prefetch instruction type.

In one or more fourth embodiments, further to the first embodiment or the second embodiment, the counter circuitry is to update the first count further based on a filter rule.

In one or more fifth embodiments, further to the fourth embodiment, according to the filter rule, the first retirement is to be counted where it is determined that an attempt to execute the first instruction resulted in a hit of a translation look-aside buffer.

In one or more sixth embodiments, further to the fourth embodiment, according to the filter rule, the first retirement is to be counted where it is determined that an attempt to execute the first instruction resulted in a miss of a translation look-aside buffer.

In one or more seventh embodiments, further to the fourth embodiment, according to the filter rule, the first retirement is to be counted where it is determined that an attempt to execute the first instruction resulted in a detection of a locked object.

In one or more eighth embodiments, further to the fourth embodiment, according to the filter rule, the first retirement is to be counted where it is determined that an attempt to execute the first instruction resulted in an access to an object which is split across multiple cache lines.

In one or more ninth embodiments, further to the first embodiment or the second embodiment, an instruction sequence comprises the first instruction and the second instruction, and wherein the counter circuitry to update the first count further based on a privilege level which is assigned to the instruction sequence.

In one or more tenth embodiments, a method at a processor comprises monitoring an execution of instructions by a processor, detecting a first retirement of a first instruction, making a first determination that the first instruction is of a prefetch type, based on the first determination, updating a first count of one or more retirements each of a respective instruction which is of the prefetch type, detecting a second retirement of a second instruction, making a second determination that the second instruction is of an instruction type other than the prefetch type, and generating a signal to prevent an update of the first count based on the second determination.

In one or more eleventh embodiments, further to the tenth embodiment, the method further comprises, based on the second determination, updating a second count of one or more other retirements.

In one or more twelfth embodiments, further to the eleventh embodiment, the one or more other retirements are each of a respective instruction type other than the prefetch instruction type.

In one or more thirteenth embodiments, further to the tenth embodiment or the eleventh embodiment, updating the first count is further based on a filter rule.

In one or more fourteenth embodiments, further to the thirteenth embodiment, according to the filter rule, the first retirement is to be counted where it is determined that an attempt to execute the first instruction resulted in a hit of a translation look-aside buffer.

In one or more fifteenth embodiments, further to the thirteenth embodiment, according to the filter rule, the first retirement is to be counted where it is determined that an attempt to execute the first instruction resulted in a miss of a translation look-aside buffer.

In one or more sixteenth embodiments, further to the thirteenth embodiment, according to the filter rule, the first retirement is to be counted where it is determined that an attempt to execute the first instruction resulted in a detection of a locked object.

In one or more seventeenth embodiments, further to the thirteenth embodiment, according to the filter rule, the first retirement is to be counted where it is determined that an attempt to execute the first instruction resulted in an access to an object which is split across multiple cache lines.

In one or more eighteenth embodiments, further to the tenth embodiment or the eleventh embodiment, an instruction sequence comprises the first instruction and the second instruction, and wherein updating the first count is further based on a privilege level which is assigned to the instruction sequence.

In one or more nineteenth embodiments, a system comprises a memory to store multiple instructions which are to be executed in a sequence, and a processor coupled to the memory, the processor comprising performance monitor circuitry to monitor an execution of the multiple instructions by the processor, wherein the performance monitor circuitry is to detect a first retirement of a first instruction, and to detect a second retirement of a second instruction, counter circuitry coupled to the performance monitor circuitry, wherein the counter circuitry is to make a first determination that the first instruction is of a prefetch type, based on the first determination, update a first count of one or more retirements each of a respective instruction which is of the prefetch type, make a second determination that the second instruction is of an instruction type other than the prefetch type, and generate a signal to prevent an update of the first count based on the second determination. The system further comprises a network interface coupled to the processor, the network interface to receive and transmit data over a network.

In one or more twentieth embodiments, further to the nineteenth embodiment, based on the second determination, the counter circuitry is further to update a second count of one or more other retirements.

In one or more twenty-first embodiments, further to the twentieth embodiment, the one or more other retirements are each of a respective instruction type other than the prefetch instruction type.

In one or more twenty-second embodiments, further to the nineteenth embodiment or the twentieth embodiment, the counter circuitry is to update the first count further based on a filter rule.

In one or more twenty-third embodiments, further to the twenty-second embodiment, according to the filter rule, the first retirement is to be counted where it is determined that an attempt to execute the first instruction resulted in a hit of a translation look-aside buffer.

In one or more twenty-fourth embodiments, further to the twenty-second embodiment, according to the filter rule, the first retirement is to be counted where it is determined that an attempt to execute the first instruction resulted in a miss of a translation look-aside buffer.

In one or more twenty-fifth embodiments, further to the twenty-second embodiment, according to the filter rule, the first retirement is to be counted where it is determined that an attempt to execute the first instruction resulted in a detection of a locked object.

In one or more twenty-sixth embodiments, further to the twenty-second embodiment, according to the filter rule, the first retirement is to be counted where it is determined that an attempt to execute the first instruction resulted in an access to an object which is split across multiple cache lines.

In one or more twenty-seventh embodiments, further to the nineteenth embodiment or the twentieth embodiment, an instruction sequence comprises the first instruction and the second instruction, and wherein the counter circuitry to update the first count further based on a privilege level which is assigned to the instruction sequence.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:

performance monitor circuitry to monitor an execution of instructions by the processor, wherein the performance monitor circuitry is to detect a first retirement of a first instruction, and to detect a second retirement of a second instruction;

counter circuitry coupled to the performance monitor circuitry, wherein the counter circuitry is to:

make a first determination that the first instruction is of a prefetch instruction type;

based on the first determination, update a first count of one or more retirements each of a respective instruction which is of the prefetch instruction type;

make a second determination that the second instruction is of an instruction type other than the prefetch instruction type; and generate a signal to prevent an update of the first count based on the second determination.

2. The processor of claim 1, wherein, based on the second determination, the counter circuitry is further to update a second count of one or more other retirements.

3. The processor of claim 2, wherein the one or more other retirements are each of a respective instruction type other than the prefetch instruction type.

4. The processor of claim 1, wherein the counter circuitry is to update the first count further based on a filter rule.

5. The processor of claim 4, wherein, according to the filter rule, the first retirement is to be counted where it is determined that an attempt to execute the first instruction resulted in a hit of a translation look-aside buffer.

6. The processor of claim 4, wherein, according to the filter rule, the first retirement is to be counted where it is determined that an attempt to execute the first instruction resulted in a miss of a translation look-aside buffer.

7. The processor of claim 4, wherein, according to the filter rule, the first retirement is to be counted where it is determined that an attempt to execute the first instruction resulted in a detection of a locked object.

8. The processor of claim 4, wherein, according to the filter rule, the first retirement is to be counted where it is determined that an attempt to execute the first instruction resulted in an access to an object which is split across multiple cache lines.

9. The processor of claim 1, wherein an instruction sequence comprises the first instruction and the second instruction, and wherein the counter circuitry to update the first count further based on a privilege level which is assigned to the instruction sequence.

10. A method at a processor, the method comprising:
monitoring an execution of instructions by a processor;
detecting a first retirement of a first instruction;
making a first determination that the first instruction is of a prefetch instruction type;
based on the first determination, updating a first count of one or more retirements each of a respective instruction which is of the prefetch instruction type;
detecting a second retirement of a second instruction;
making a second determination that the second instruction is of an instruction type other than the prefetch instruction type; and
generating a signal to prevent an update of the first count based on the second determination.

11. The method of claim 10, further comprising:
based on the second determination, updating a second count of one or more other retirements.

12. The method of claim 10, wherein updating the first count is further based on a filter rule.

13. The method of claim 12, wherein, according to the filter rule, the first retirement is to be counted where it is determined that an attempt to execute the first instruction resulted in a hit of a translation look-aside buffer.

14. The method of claim 12, wherein, according to the filter rule, the first retirement is to be counted where it is determined that an attempt to execute the first instruction resulted in a miss of a translation look-aside buffer.

15. The method of claim 12, wherein, according to the filter rule, the first retirement is to be counted where it is determined that an attempt to execute the first instruction resulted in a detection of a locked object.

16. The method of claim 12, wherein, according to the filter rule, the first retirement is to be counted where it is determined that an attempt to execute the first instruction resulted in an access to an object which is split across multiple cache lines.

17. A system comprising:
a memory to store multiple instructions which are to be executed in a sequence;
a processor coupled to the memory, the processor comprising:
performance monitor circuitry to monitor an execution of the multiple instructions by the processor, wherein the performance monitor circuitry is to detect a first retirement of a first instruction, and to detect a second retirement of a second instruction;
counter circuitry coupled to the performance monitor circuitry, wherein the counter circuitry is to:
make a first determination that the first instruction is of a prefetch instruction type;
based on the first determination, update a first count of one or more retirements each of a respective instruction which is of the prefetch instruction type;
make a second determination that the second instruction is of an instruction type other than the prefetch instruction type; and
generate a signal to prevent an update of the first count based on the second determination; and
a network interface coupled to the processor, the network interface to receive and transmit data over a network.

18. The system of claim 17, wherein the counter circuitry is to update the first count further based on a filter rule.

19. The system of claim 18, wherein, according to the filter rule, the first retirement is to be counted where it is determined that an attempt to execute the first instruction resulted in a hit of a translation look-aside buffer.

20. The system of claim 18, wherein, according to the filter rule, the first retirement is to be counted where it is determined that an attempt to execute the first instruction resulted in a miss of a translation look-aside buffer.

* * * * *